US008211967B2

(12) United States Patent
La Scala et al.

(10) Patent No.: US 8,211,967 B2
(45) Date of Patent: *Jul. 3, 2012

(54) COMPOSITE REPAIR RESINS CONTAINING MINIMAL HAZARDOUS AIR POLLUTANTS AND VOLATILE ORGANIC COMPOUND

(75) Inventors: John Joseph La Scala, Bear, DE (US); James Matthew Sands, Kingsville, MD (US); Giuseppe Raffaello Palmese, Hainsport, NJ (US)

(73) Assignees: Drexel University, Philadelphia, PA (US); The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,061

(22) Filed: Oct. 27, 2011

(65) Prior Publication Data

US 2012/0041124 A1 Feb. 16, 2012

Related U.S. Application Data

(63) Continuation of application No. 11/689,191, filed on Mar. 21, 2007, now Pat. No. 8,048,949, which is a continuation-in-part of application No. 11/124,551, filed on May 6, 2005, now Pat. No. 7,524,909.

(60) Provisional application No. 60/569,379, filed on May 7, 2004.

(51) Int. Cl.
*C08K 3/34* (2006.01)
*C08K 3/40* (2006.01)

(52) U.S. Cl. ........ 524/451; 524/405; 524/424; 524/430; 524/492; 524/494

(58) Field of Classification Search ................. 524/405, 524/424, 430, 451, 492, 494
See application file for complete search history.

(56) References Cited

U.S. PATENT DOCUMENTS

| | | | |
|---|---|---|---|
| 3,125,592 A | 3/1964 | Nevin | |
| 3,224,989 A | 12/1965 | Nevin | |
| 3,256,225 A | 6/1966 | Nevin | |
| 3,291,764 A | 12/1966 | Findley | |
| 3,450,613 A | 6/1969 | Steinberg | |
| 3,676,384 A | 7/1972 | Rheineck et al. | |
| 3,828,608 A | 8/1974 | Yamamoto | |
| 3,878,077 A | 4/1975 | Borden et al. | |
| 3,931,075 A | 1/1976 | Trecker et al. | |
| 3,979,270 A | 9/1976 | Trecker et al. | |
| 4,025,477 A | 5/1977 | Borden et al. | |
| 4,359,370 A | 11/1982 | De La Mare et al. | |
| 4,438,228 A | 3/1984 | Schenck | |
| 4,740,367 A | 4/1988 | Force et al. | |
| 4,918,120 A | 4/1990 | Vanderlaan et al. | |
| 5,286,554 A | 2/1994 | Cowley et al. | |
| 5,356,972 A | 10/1994 | Sperling et al. | |
| 5,523,337 A | 6/1996 | Banerjee et al. |
| 5,523,350 A | 6/1996 | Venkataswamy et al. |
| 5,578,297 A | 11/1996 | Mellul et al. |
| 5,719,301 A | 2/1998 | Sleeter |
| 5,866,628 A | 2/1999 | Likavec et al. |
| 6,121,398 A | 9/2000 | Wool et al. |
| 6,203,720 B1 | 3/2001 | Thames et al. |
| 6,350,826 B1 | 2/2002 | Herold |
| 6,583,218 B1 | 6/2003 | Airola et al. |
| 2003/0045609 A1 | 3/2003 | Thames |
| 2005/0277734 A1 | 12/2005 | Kime |

FOREIGN PATENT DOCUMENTS

| | | |
|---|---|---|
| DE | 3938149 A1 | 5/1991 |
| EP | 0081973 A1 | 6/1983 |
| EP | 0437001 A1 | 7/1991 |
| FR | 2374419 | 7/1978 |
| GB | 1248919 | 10/1971 |
| JP | 48-98883 | 12/1973 |
| JP | 48-102647 | 12/1973 |
| JP | 49-103144 | 9/1974 |
| JP | 50-75649 | 6/1975 |
| JP | 50-126706 | 10/1975 |
| JP | 54-070397 | 6/1979 |
| JP | 56-159222 | 12/1981 |
| JP | 57-190016 | 11/1982 |
| JP | 61-133229 | 6/1986 |

OTHER PUBLICATIONS

La Scala, J.J. et al., "Fatty Acid-Based Monomers as Styrene Replacements for Liquid Molding Resins," Proceedings of the 48th International SAMPE Symposium/Exhibition, Long Beach, CA, May 2003.
Devia, N. et al., "Simultaneous Interpenetrating Networks Based on Castor Oil Elastomers and Polystyrene. 2. Synthesis and Systems Characteristics," Macromolecules, 1979, 360-369, vol. 12, No. 3.
Devia, N. et al., "Simultaneous Interpenetrating Networks Based on Castor Oil Elastomers and Polystyrene. III. Morphology and Glass Transition Behavior," Polymer Eng. Sci., 1979, 869-877, vol. 19, No. 12.
Devia, N. et al., "Simultaneous Interpenetrating Networks Based on Castor Oil Elastomers and Polystyrene. IV. Stress-Strain and Impact Loading Behavior," Polymer Eng. Sci., 1979, 878-882, vol. 19, No. 12.
Guo, A. et al., "Rigid Polyurethane Foams Based on Soybean Oil," J. Appl. Polym. Sci., 2000, 467-473, vol. 77.
Teeter, H.M. et al., "Polymerization of Drying Oils. III. Some Observations on Reaction of Maleic Anhydride With Methyl Oleate and Methyl Linoleate," J. Am. Oil Chem. Soc., 1948, 158-162, vol. 25.
King, G., "The Mechanism of the Oxidation of Oleic and Elaidic Acids and their Methyl Esters by Hydrogen Peroxide in Acetic Acids, Further Observations on the Configurations of the 9:10-Dihydroxystearic Acids," Chemical Society Journal London, 1943, 37-38.

(Continued)

*Primary Examiner* — Peter Szekely
(74) *Attorney, Agent, or Firm* — Knoble Yoshida & Dunleavy, LLC

(57) ABSTRACT

The present invention relates to a composition and method for fabricating composite resins that produce either reduced or zero volatile organic compound (VOC) and zero hazardous air pollutant (HAP) emissions. The non-volatile reactive diluents of the composite resin, fatty acid monomers, enhance the stability, shelf-life, flexibility and strength of the composite resin. The resins incorporating fatty acid monomers may be used to repair military equipment or for any commercial repair purposes.

20 Claims, 11 Drawing Sheets

OTHER PUBLICATIONS

Swern, D. et al. "Hydroxylation of Monounsaturated Fatty Materials with Hydrogen Peroxide," J. Am. Chem. Soc., 1945, 1786-1789, vol. 67.

Boquillon, N. and Fringant, C., "Polymer Networks Derived From Curing of Epoxidised Linseed Oil: Influence of Different Catalysts and Anhydride Hardeners," Polymer, 2000, 8603-8613, vol. 41.

Li, F. and LaRock, R., "New Soybean Oil-Styrene-Divinylbenzene Thermosetting Copolymers. II. Dynamic Mechanical Properties," J. Poly Sci., Part B: Poly Phys., 2000, 2721-2738, vol. 38.

Rosch, J. and Mulhapt, R., "Polymers from Renewable Resources: Polyester Resins and Blends Based upon Anhydride-cured Epoxidized Soybean Oil," Polymer Bulletin, 1993, 679-685, vol. 31.

Crivello, J.V. et al., "Fabrication and Mechanical Characterization of Glass Fiber Reinforced UV-Cured Composites from Epoxidized Vegetable Oils," J. Appl. Polymer Sci., 1997, 2703-2087, vol. 64, No. 11.

Shogren, R.L., "Preparation and Characterization of a Biodegradable Mulch: Paper Coated with Polymerized Vegetable Oils," J. Appl. Polymer Sci., 1999, 2159-2167, vol. 73.

Frischinger, I. and Dirlikov, S., "Toughening of Epoxy Resins by Epoxidized Vegetable Oils," Polymer Comm., 1991, 536-537, vol. 32.

Barrett, L.W. et al., "Naturally Functionalized Triglyceride Oils in Interpenetrating Polymer Networks," J. American Oil Chemists' Society, 1993, 523-534, vol. 70, No. 5.

Tran, N.B. et al., "Castor Oil-Based Polyurethanes: 1. Structural Characterization of Castor Oil—Nature of Intact Glycerides and Distribution of Hydroxyl Groups," Polymer, 1997, 2467-2473, vol. 38, No. 10.

Williams, George I. and Wool, Richard P., "Composites from Natural Fibers and Soy Oil Resins," Applied Composite Materials, 2000, 421-432, vol. 7.

Bunker, Shana P. and Wool, Richard P, "Synthesis and Characterization of Monomers and Polymers for Adhesives from Methyl Oleate," J. Poly. Sci: Part A, Polym. Chem., 2001, 451-458, vol. 40.

La Scala, John and Wool, Richard P., "The Effect of Fatty Acid Composition on the Acrylation Kinetics of Epoxidized Triacylglycerols," J. of American Oil Chemists' Society, 2002, 59-63, vol. 79, No. 1.

La Scala, John and Wool, Richard P., "The Effect of FA Composition on the Epoxidation Kinetics of TAG," J. of American Oil Chemists' Society, 2002, 373-378, vol. 79, No. 4.

Khot, Shrikant N. et al., "Development and Application of Triglyceride-Based Polymers and Composites," J. of Applied Polymer Science, 2001, 703-723, vol. 82.

La Scala, John J. et al., "Successful Initial Development of Styrene Substitutes and Suppressants for Vinyl Ester Resin Formulations," Army Research Laboratory Technical Report, ARL-TR-3023, 2003.

Kirschenbauer, H.G., "Fats and Oils: An Outline of Their Chemistry and Technology," Reinhold Publishing Corporation, New York, 1960.

Sands, James M. et al., "Greening Future Military Composite Platforms by Controlling Volatile Organic Compound Emissions from Vinyl Ester Resins," SERDP Partners in Environmental Technology, Washington, DC, 2002.

La Scala, John J. et al., "Low Cost and High-Impact Environmental Solutions for Composite Structures," Annual SERDP Report, 2003, 1271.

Wool, Richard P. et al., "Bio-Based Composites," ECCM-11 Rhodes, 2004.

Bunker, Shana et al., "Miniemulsion Polymerization of Acrylated Methyl Oleate for Pressure Sensitive Adhesives," International Journal of Adhesion & Adhesives, 2003, 29-38, vol. 23.

Guo, Andrew et al., "Structure and Properties of Halogenated and Nonhalogenated Soy-Based Polyols," Journal of Polymer Science: Part A: Polymer Chemistry, 2000, 3900-3910, vol. 38.

Guo, Andrew et al., "Polyols and Polyurethanes from Hydroformylation of Soybean Oil," Journal of Polymers and the Environment, 2002, 49-52, vol. 10, Nos. 1/2.

La Scala, John J. et al., "Environmentally Friendly Polymers and Liquid Molding Resins," AIChE, Indianapolis, 2002.

La Scala, John J. et al., "Fatty Acid-Based Monomers as Styrene Replacements for Liquid Molding Resins," Presented at AIChE, FA, 2003.

Chantler, James et al., "Soybean SMC," Composites 2002 Convention and Trade Show, Atlanta, Georgia, Sep. 25-27, 2002.

La Scala, John J. et al., "The Use of Bimodal Blends of Vinyl Ester Monomers to Reduce VOC Emissions," AIChE, Bimodal, 2003.

Youd, Stephen J., "Derakane(TM) Epoxy Vinyl Ester Resins—From the First 25 Years, to the 21st Century," Dow Deutschland Inc., 7th University of Witwatersrand Composites Conference: Johannesburg, Rep. S. Africa, Aug. 10, 1994.

Can, E. et al., "Rigid Thermosetting Liquid Molding Resins from Renewable Resources. II. Copolymers of Soybean Oil Monoglyceride Maleates with Neopentyl Glycol and Bisphenol A Maleates," Journal of Applied Polymer Science, 2002, 972-980, vol. 83.

Javni, Ivan and Petrovic, Zoran, "Polymers from Soybean Oil," ANTEC Conference Proceedings of the 1997 55th Annual Technical Conference, ANTEC, Part 1, Apr. 27-May 2, 1997.

Shi, Wenfang et al., "Applications of Rosin-Modified Epoxidized Soya Bean Oil Acrylate in UV Cure Coatings," Journal of Photopolymer Science and Technology, 1992, 453-460, vol. 5, No. 3.

Teeter, H.M. et al., "Reactions of Conjugated Fatty Acids. IV. Diels-Alder Adducts of 9,11-Octadecadienoic Acid," Journal of Organic Chemistry, 1957, 512-514, vol. 22.

Javni, I. et al., "Soybean-Oil-Based Polyisocyanurate Rigid Foams," Journal of Polymers and the Environment, 2004, 123-129, vol. 12, No. 3.

Plimmer, H., "The Reaction of Maleic Anhydride with Non-Conjugated Unsaturated Fatty Materials," Journal of the Oil & Colour Chemists' Association, 1949, 99-112, vol. 32, No. 345.

Bickford, W.G. et al., "Autoxidation of Fats. II. Preparation and Oxidation of Methyl Oleate-Maleic Anhydride Adduct," Journal of the American oil Chemists' Society, 1948, 254-257, vol. 25.

Isii, Y., "Peroxide Oxidation of Triglycerides to Make Epoxidized Triglycerides," J. Soc. Chem. Industry, Japan, 1940, 255, 315, 374, vol. 43.

1b

3b

4a

4b

4c 6b, 8a

7b

8b

COMPOSITE REPAIR RESINS CONTAINING MINIMAL HAZARDOUS AIR POLLUTANTS AND VOLATILE ORGANIC COMPOUND

CROSS REFERENCE TO RELATED APPLICATIONS

This application is a continuation of U.S. patent application Ser. No. 11/689,191, filed on Mar. 21, 2007, now U.S. Pat. No. 8,048,949, which, in turn, is a continuation-in-part of U.S. patent application Ser. No. 11/124,551, filed May 6, 2005, now U.S. Pat. No. 7,524,909, which, in turn, claims the benefit of U.S. provisional patent application no. 60/569,379, filed on May 7, 2004, pursuant to 35 U.S.C. §119(e).

BACKGROUND OF THE INVENTION

1. Field of the Invention

The present invention relates to a composition and method for fabricating composite resins with reduced and zero volatile organic compound (VOC) and hazardous air pollutant (HAP) emissions. More specifically, the present invention relates to composites or resins incorporating fatty acid monomers for use as a repair resin.

2. Brief Description of the Prior Art

Composite resins used to repair equipment, vehicles, planes and watercraft typically contain 10%-20% by weight hazardous air pollutants (HAP) and volatile organic compounds (VOC). HAP and VOC chemicals are used to reduce repair resin viscosity to form a resin that is both easy to blend and easy to apply. Generally, composite resins are composed of a polymeric binder component and a hardener. The polymeric binder generally includes a cross-linking agent, such as vinyl ester or unsaturated polyester, a reactive diluent, such as styrene, a free-radical decomposition promoter, a free-radical inhibitor, and various inorganic additives, such as talc, magnesium carbonate, chopped glass fiber and cabosil. Not including the additives, the HAP and VOC content constitutes about 20%-50% of the resin binder content by weight. The polymeric binder is mixed with the hardener which typically comprises a free-radical initiator and surfactants.

In an effort to minimize the environmental damage caused by HAP emissions, the Environmental Protection Agency has established new regulations limiting the HAP content of composite materials. The regulations require compliance with facility wide emissions limits by 2008 and continuous emissions monitoring of all HAP-containing composite materials. Therefore there exists a need to develop composite resins capable of mitigating HAP emissions and meeting the proposed guidelines.

This legislation particularly affects the manufacturing of composite resins used for repairing military equipment. A recent 2006 report to the Army entitled, "Miscellaneous Adhesives and Sealants Technology Thrust Area", states that currently, there exist no environmentally friendly repair resins. Consequently, the military generates thousands of pounds of hazardous waste from expired resins annually. HAP emissions from vehicle repairs are one of the largest sources of emissions from miscellaneous coatings in the Army. Moreover, because it is impractical to use enclosures and trapping devices, field repair resins are typically cured in the open, generating a significant amount of HAP emissions.

Additionally, there exists a need to develop a more durable composite repair resin. The high reactivity of the current repair resin chemistry results in a short shelf-life of less than 1 year; thermal and mechanical properties decrease rapidly upon expiration of the shelf-life. This is particularly problematic in view of the fact that military equipment must be able to withstand extreme conditions. Therefore typical military repair resins, such as Bondo™, 6294 Dent Filler, 887 Metal-2-Metal Reinforcement and other vinyl ester composite resins, lack sufficient durability and material properties to endure military applications.

Military equipment is frequently subject to damaged by impact of a foreign object, ballistic impact, moisture intrusion and expansion, corrosion, collision and maintenance-induced damage. The degree of damage may range from: light damage, requiring only aesthetic repairs and coating repairs; moderate damage, requiring repair of delaminations, small patches and edge repairs, to heavy damage, requiring full depth, core and substructure repairs.

For a typical light to moderate field repair, any remaining coating in the repair area is removed by hand sanding or portable tools. The damaged part is then cut out in an appropriate configuration, often circular. Scarfing, removal of top layers of material done at a shallow angle, is commonly done by hand. The surface is then sanded further and cleaned using an available solvent. Composite repair resins, such as some Bondo™ products, containing short reinforcing fibers can then be applied to the damage zone. The resin cures at room temperature. Light repairs can be done in a similar manner using Bondo™ products and similar composite repair resins without much, if any, scarfing.

Depot repair is typically a bit more elaborate. Rather than using simple repair resins for moderate or heavy damage, the damage zone will be filled with fibers or honeycomb and vacuum infused or cured using wet lay-up. This allows the use of more elaborate resin systems, such as phenolics, and autoclave cure. However, for most light repair and some moderate repair, Bondo™ and similar resins are used for the repair. Not only are these repair resins used in composite structures, they are also used to do light and moderate repair to non-armor metal structures, such as body paneling, by filling in holes and dents in a manner similar to that used for composite structures.

In light of the need for durable reduced HAP repair resins for military as well as commercial use, various environmentally friendly material alternatives such as electron-beam (E-beam) curable repair resins have been proposed. Unfortunately, E-beam instruments impose a high capital cost and are not portable, making military field repair impractical. Furthermore, E-beam curable resins are not a drop-in alternative to current repair resins, and are therefore not highly desired by the end users.

Epoxy resins were also found inadequate, in part because epoxy resins cost approximately four times the amount of vinyl ester (VE) and unsaturated polyester (UPE) resins. In addition, epoxy resins are usually formulated in two part mixtures that need to be added in precise ratios. Inaccurate ratios or poor mixing can result in poor and inconsistent properties. Epoxies can be cured using agents, such as a dicyandiamide, where exact mix ratios are not important, but cure of these systems does not occur until elevated temperatures, which is impractical for field repair.

Researches have also contemplated composite repair resins that reduce HAP and VOC components such as styrene. Simply reducing the styrene content in composite resins, however, causes one of two significant problems. If the resin is filled to the same extent with inorganic fillers for the low styrene formulation as it is with the regular formulation, the low HAP repair resin will have an unacceptably high viscosity. Alternatively, lower filler contents can be used, but these will detrimentally affect the stiffness of the resulting repair.

It has also been proposed to replace the commonly used HAP component styrene with other components, such as 2-hydroxymethacrylate. These substitutions generally produce inferior resin viscosity and properties in comparison to styrene-based thermosetting resins. Moreover, 2-hydroxymethacrylate produces significant VOC emissions. Ortho and para-methyl styrene have lower volatilities than styrene; however, these chemicals still produce significant VOCs and would probably be classified as HAPs if used on a large scale.

U.S. Pat. Nos. 4,918,120 and 5,286,554 disclose incorporating additives, such as paraffin waxes, to suppress styrene emissions. These resins, however, suffer from poor polymer performance and poor interfacial adhesion in fiber-matrix composites. Furthermore, studies have shown that these additives do not effectively decrease styrene emissions during the time-scale of use.

In an effort to develop a practical environmentally friendly composite resin, fatty acid monomers (FAM) have also been considered. U.S. patent publication no. 2005/0277734 discloses a polyurethane sealant including a fatty acid ester. Additionally, U.S. patent publication no. 2005/0250923 also discloses a technology for compatibilizing fatty acid monomers and vinyl ester and unsaturated polyester resins. The composite resin attaches free-radically polymerizable functionality to fatty acids, while adding other functionality to make the fatty acid monomers soluble in VE and UPE resins. Composite resin formulations incorporating fatty acid monomers reduced styrene content up to about 78%. Although these resins reduce HAP and VOC emissions, the patents do not disclose the capability of completely eliminating HAP and VOC components or emissions. Nor do these patents present inorganically filled formulations that are useable for repair applications.

There are a number of reasons why the study and development of fatty acid-based monomers for use in composite resins is important. First, fatty acid monomers can be used to replace some or all of the styrene used in liquid thermosetting resins. Fatty acid monomers are excellent alternatives to styrene because of their low cost and low volatility. Furthermore, fatty acids are derived from plant oils, and are therefore a renewable resource. Thus, not only does the use of fatty acid monomers in liquid molding resins reduce health and environmental risks, but it also promotes global sustainability.

Fatty acids and triglycerides have been used in a number of polymeric applications. The preparation of epoxidized and hydroxylated fatty acids has been reviewed by many researchers, including Gunstone, Litchfield, Swern, etc. Epoxidized and acrylated triglycerides have been used as plasticizers and toughening agents. In fact, the largest non-food use of triglycerides is the use of epoxidized soybean and linseed oils as plasticizers in poly(vinyl chloride). Epoxidized triglycerides have also been studied for use as toughening agents in epoxy polymers.

The production of free radically reactive plant oil-based monomers is a more recent invention. Nevin patented the preparation of acrylated triglycerides in U.S. Pat. No. 3,125, 592, which can be homopolymerized or copolymerized with other free-radically reactive monomers. These acrylated triglycerides have been used in coatings, inks, toughening agents, and adhesives. Using this technology, adhesives have been made from fatty acid methyl esters. In addition, thermosetting liquid molding resins have been made using chemically modified plant oils as cross-linking agents in thermosetting resins (U.S. Pat. No. 6,121,398). Anhydrides, such as phthalic anhydride, have been used to form air curable coatings (Japanese Patent nos. 73-125724, 74-103144, 80-62752, and 81-64464). In addition, the use of maleic anhydride for making free-radically reactive triglycerides has been patented (U.S. Pat. No. 6,121,398). However, until now, fatty acids have not been used as reactive diluents in thermosetting liquid molding resins.

SUMMARY OF THE INVENTION

In a first aspect, the invention relates to a composite resin incorporating fatty acid monomers that generates minimal or no HAP/VOC emissions.

In a second aspect, the present invention relates to processes for the synthesizing the fatty acid monomers and fabricating the composite resin.

In a third aspect of the invention, fatty acid monomers are used to replace some or all of the volatile reactive diluents in liquid molding resins.

In a fourth aspect, the present invention relates to methods of using the composite resins of the invention as repair resins.

DETAILED DESCRIPTION OF THE PREFERRED EMBODIMENTS

Figure 1:
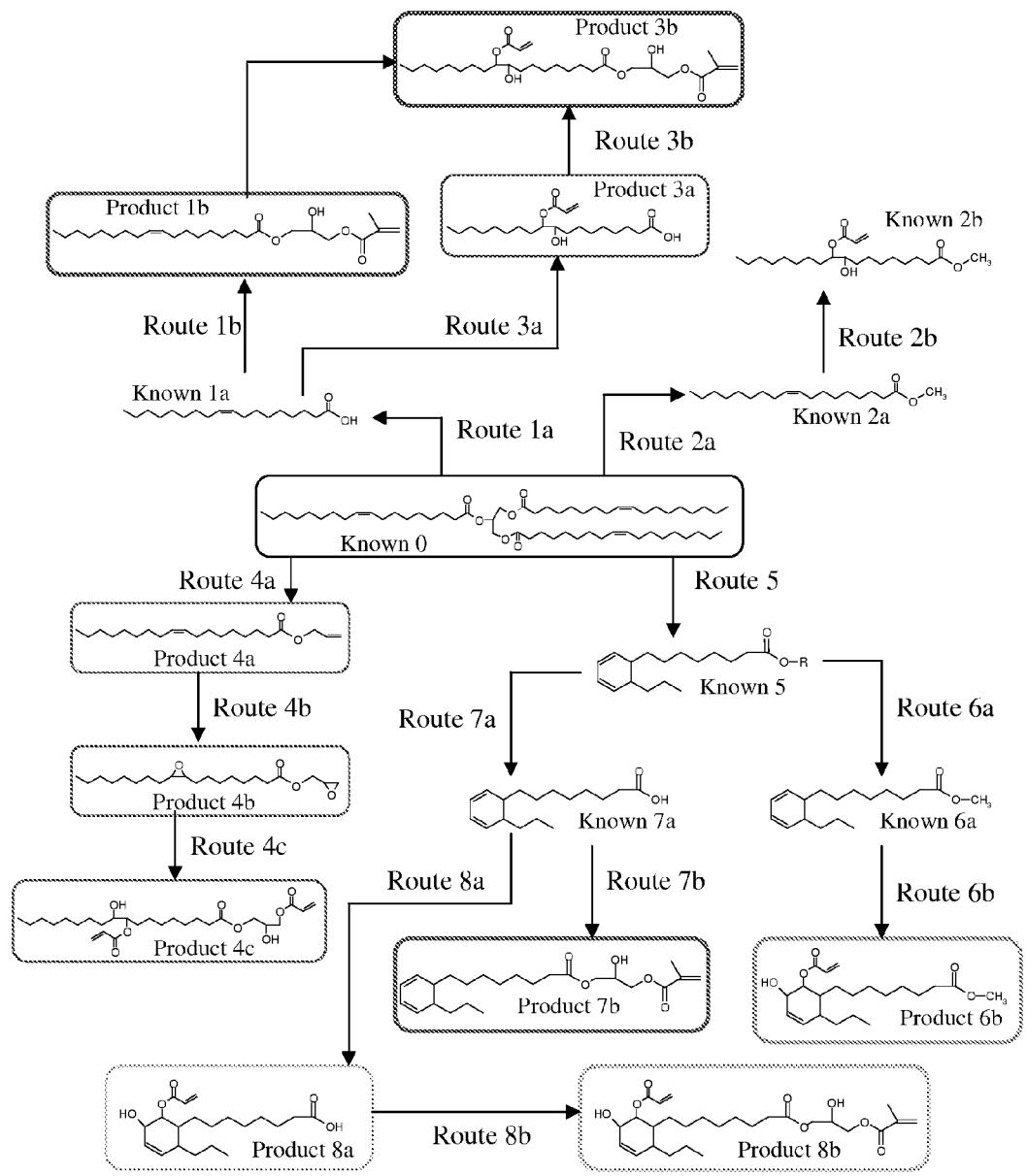
FIG. 1 shows a means for synthesizing fatty acid-based monomers.

The present invention is directed to reduced and zero hazardous air pollutants (HAP) and reduced and zero volatile organic compounds (VOC) generating composite resins, comprising a resin binder component, a hardener component and a filler component. More specifically, the invention is directed to a composition including a resin binder component comprising a cross-linking polymer, at least one reactive diluent and a promoter, wherein the resin binder incorporates fatty acid monomers for use as non-volatile reactive diluents.

The composite repair resin consists of resin binder, composed of a cross-linker and a reactive diluent, organic/inorganic fillers, free radical inhibitors, and promotors. The resin binder binds the entire composite system together when polymerized. The cross-linking agents give strength, chemical resistance, and heat resistance to the resulting material. The reactive diluent gives the resin binder a low viscosity enabling the resin to be filled to a sufficient extent with organic/inorganic reinforcement. The free-radical promoter catalyzes the breakdown of free-radical initiators at room temperature. Free radical inhibitors reduce the rate of polymerization once free-radical breakdown has occurred, and thus lengthen the working time.

The resin binder preferably comprises 20-70% by weight of the composite resin. More preferably, the resin binder comprises 30-65% by weight of the composite resin. Most preferably, the resin binder comprises 40-60% by weight of the composite resin.

The cross-linking monomer may comprise from about 5% to about 90% by weight of the resin binder, more preferably about 10% to about 85% by weight of the resin binder and most preferably about 15% to about 80% by weight of the resin binder.

The cross-linking polymer may comprise any vinyl esters, polyurethanes, unsaturated polyesters, other free-radically reactive cross-linking systems and/or mixtures thereof.

Preferably, the cross-linking polymer is any vinyl ester or unsaturated polyester (UPE). Suitable vinyl esters include, but are not limited to, methacrylated and acrylated glycidyl ethers of bisphenols. Suitable bisphenols include, but are not limited to, bisphenol A, hexafluorobisphenol A, bisphenol E, bisphenol F, tetramethyl bisphenol E, tetramethyl bisphenol F, bisphenol M, bisphenol C, bisphenol P and bisphenol Z. Methacrylates and acrylates of ethoxylated bisphenols may also be employed. Vinyl esters having an average vinyl functionality greater than one should be employed to induce adequate cross-linking This includes systems such as: acrylic and alkyl-acrylic vinyl esters of epoxy novolacs, acrylates tris-hydroxyphenylmethane glycidyl ether (THPM-GE), ethoxy phenol novolacs, and ethoxylated tris-hydroxyphenylmethane. Also, brominated versions of the above systems, such as, for example, brominated bisphenol A based vinyl esters, may be employed. Preferred vinyl esters are the bisphenol vinyl esters due to their relatively low cost and high performance capabilities.

Preferably, suitable unsaturated polyesters include diethylene glycol-based fumarates maleates, and phthalates. These unsaturated polyesters are inexpensive and easily manufactured. UPE monomers with an average unsaturation number of more than one are preferred to induce adequate cross-linking.

The reactive diluent of the present invention comprises at least one fatty acid monomer (FAM). In a preferred embodiment, the FAM comprises methacrylated fatty acid (MFA) monomers, methacrylated fatty acid esters, acrylated fatty acid esters and/or derivatives thereof. Exemplary fatty acids that may be employed to make the fatty acid monomers of the present invention, include, but are not limited to, butyric acid, capric acid, caprylic acid, caproic acid, lauric acid, myristic acid, palmitic acid, stearic acid, oleic acid and linoleic acid. Preferably, the FAM comprises about 5% to about 95% by weight of the composite resin binder, more preferably about 15% to about 80% by weight of the composite resin binder and most preferably about 20% to about 75% by weight of the composite resin binder.

FAMs are ideal candidates to replace some or all of the high VOC chemicals such as styrene in vinyl ester, unsaturated polyester and other thermosetting liquid molding resins because they are characterized by low volatilities, low viscosities and are reactive with other vinyl monomers in addition to being inexpensive and promoting global sustainability, since they are derived from renewable resources. In comparison to styrene and other standard reactive diluents, which are primarily volatile organic compounds and hazardous air pollutants, FAMs are generally non-volatile under typical fabrication and use conditions due to their relatively high molecular weight. Therefore, they do not yield HAP or VOCs during manufacture or use.

Without being bound by theory, the present invention may be used to reduce or eliminate VOC/HAP emissions by (1) lowering the VOC/HAP content of the resultant resin and/or (2) binding more of the reactive diluents into the resin to reduce the amount of reactive diluent that can volatilize.

FAMs are also significantly more stable than styrene monomers. The shelf-life of resins incorporating FAM monomers may be considerably longer than that of commercial resins. Furthermore, higher reactive diluent to cross-linker ratios are typically used in the formulated zero HAP repair resins than are used in commercial repair resins, which may further increase the shelf-life of fatty acid-based repair resins.

The use of FAMs as reactive diluents has been tested experimentally and found to be successful, i.e. repair resins using fatty acid monomers to replace some or all of the styrene in these resins have been found to have acceptable resin viscosities and polymer mechanical properties similar to that of commercial repair resins that contain significant HAP component.

The promoter may be any compound that is capable of catalyzing the room temperature breakdown of a free radical initiator to induce room temperature polymerization of a resin. In a preferred embodiment, the promoter is dimethylaniline. Other promotors such as cobalt naphthenate can be used. Preferably, the promoter comprises about 0.05% to about 5% by weight of the composite resin, more preferably about 0.1% to about 2% by weight of the composite resin and most preferably about 0.2% to about 1% by weight of the composite resin. The promoter is added to promote free radical curing by initiators such as benzoyl peroxide initiators, which are typically used in the hardener component.

Free-radical inhibitors are molecules that retard the decomposition of a free-radical initiator or prevent polymerization due to the decomposition of a free-radical initiator. In a preferred embodiment, no additional inhibitor (outside what is normally added to the monomers during synthesis) is necessary. Yet, if needed to create longer working times, a preferred inhibitor is hydroquinone. Other inhibitors, such as 2,4-pentanedione can be used. Preferably, the inhibitor comprises about 0 to about 0.5% by weight of the composite resin, more preferably about 0% to about 0.1% by weight of the composite resin and most preferably about 0% to about 0.05% by weight of the composite resin.

The composite resin also includes a hardener component which comprises an initiator and surfactants. The hardener may comprise any standard or commercial hardening compound for repair resins, such as Bondo™ Red Cream Hardener, and preferably constitutes about 2% by weight of the composite resin. Additionally, benzoyl peroxide was mixed with soap or soap and canola oil to prepare an adequate hardener. The soap and triglycerides allow for easy mixing of the hardener in the viscous repair resin.

The initiator component may comprise benzoyl peroxide, methyl ethyl ketone peroxide (MEKP), cumene hydroperoxide or any other standard initiator. Preferably, the hardener is a liquid solution that contains a free-radical initiator; most preferably, the initiator is benzoyl peroxide.

Inorganic filler components, such as talc and chopped glass fibers may also be mixed into the resin formulations, for example, by hand mixing or through the use of high shear mixers. Various inorganic filler components and contents may be employed. The inorganic materials may also have a variety of different particle sizes preferably ranging from nano-sized to micron-sized or larger.

Although the preferred embodiment of the composite resin contains no components that generate HAP, the present invention also contemplates composite resins which incorporate small amounts of HAP monomers. Reduced VOC/HAP repair resins may be prepared by blending the fatty acid monomers described above and styrene or other conventional HAP or VOC monomers, such as methyl methacrylate, divinyl benzene, 2-hydroxymethacrylate, alpha-methyl styrene, para-methyl styrene or mixtures thereof, with VE and/or UPE monomers. In contrast to typical repair resins which contain about 10%—about 30 wt % HAP monomers, the compositions of the present invention may contain about 0%—about 15% by weight of HAP monomers. More preferably, the composite resins contain about 0%—about 10% by weight of HAP monomers and, most preferably, the composite resins contain not more than about 5% by weight of other HAP monomers.

Exemplary filled repair resins of the present invention have about 20 to about 70 wt % resin (1-90% VE or UPE, 1-90% FAM, and 0-15 wt % styrene), about 0 to about 50 wt % talc, about 0 to about 50% magnesium carbonate, about 0 to about 30% sodium metaborate, about 0 to about 35 wt % fibrous glass, about 0 to about 30% silica thickener, about 0 to about 10 wt % glass microspheres, about 0 to about 10 wt % phenolic microballoons, about 0 to about 30% alumina, and about 0 to about 30% sand, with preferably about 30 to about 65 wt % resin, about 5 to about 40 wt % talc, about 5 to about 40% magnesium carbonate, about 0 to about 20% sodium metaborate, about 0 to about 25 wt % fibrous glass, about 0 to about 20% silica thickener, about 0 to about 10 wt % glass microspheres, about 0 to about 10 wt % phenolic microballoons, about 0 to about 10% alumina, and about 0 to about 10% sand, and most preferably about 40 to about 60 wt % resin, about 15 to about 35 wt % talc, about 15 to about 30% magnesium carbonate, about 3 to about 10% sodium metaborate, about 0 to about 15 wt % fibrous glass, about 0 to about 15% silica thickener, about 0 to about 10 wt % glass microspheres, about 0 to about 10 wt % phenolic microballoons, about 0 to about 10% alumina, and about 0 to about 10% sand.

The composite resins of the present invention have similar properties relative to commercial resins, such as styrene based vinyl esters and polyesters, in addition to enhanced dimensional stability, lower exotherm, higher toughness, produce much lower emissions, and have little or no HAP or VOC chemicals, and a longer shelf-life. Moreover, because MFA resins have broader glass transitions, $T_g$, than commercial resins, they also have enhanced low temperature flexibility which improves durability and weatherability. The resin further, does not produce a HAP/VOC related odor during manufacturing and provides for a safe work environment by reducing or eliminating exposure to hazardous and volatile chemicals.

Figure 11:
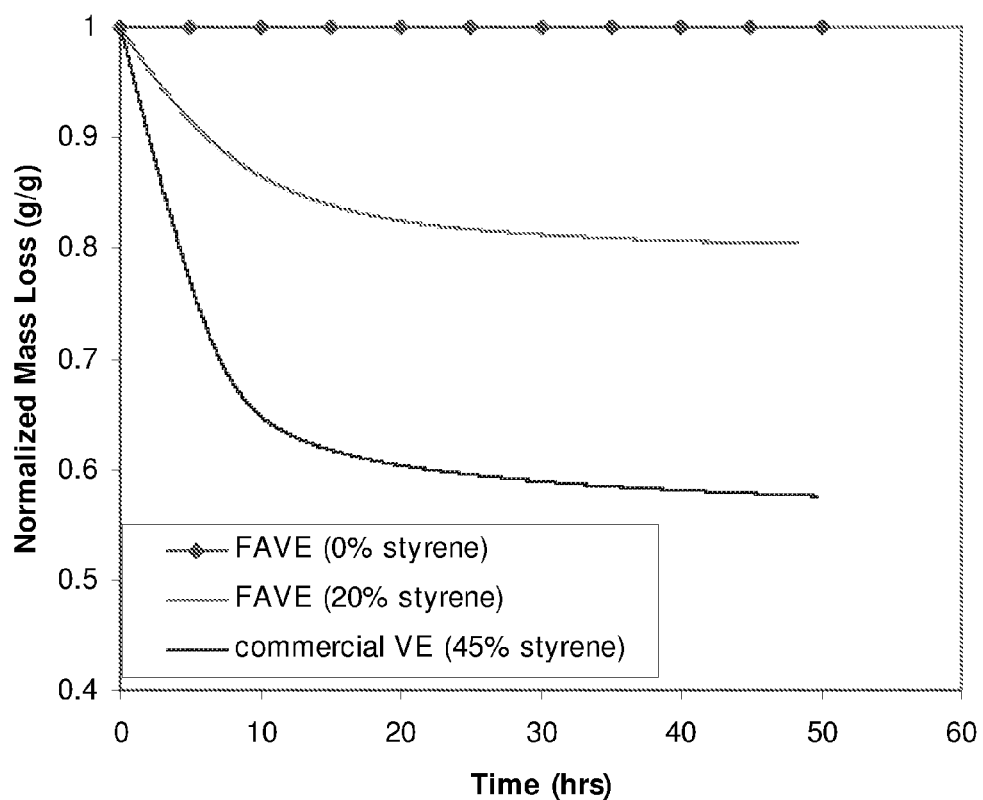
FIG. 11 is a thermogravimetric analysis (TGA) of commercial resins and the fatty acid vinyl ester resins (FAVE) showing that the commercial resins have significantly more mass loss because only the styrene component evaporates.

Advantageously, the resin is easy to apply to surfaces and may be easily painted and coated. Due to its lack of volatility, the resin also does not blister upon painting or coating with another material. By contrast, commercial resins do not fully cure at room temperature. Thereby, unreacted HAP components can out-gas HAPs and VOCs over time, along with their characteristic smell. In addition, if the repaired area is painted, the out-gassing can produce blisters in the paint. FIG. 11 illustrates this comparison showing the mass loss for uncured resins as a function of time for resins formulated with VE, MFA, and styrene.

The composite resin of the present invention has a number of applications as a commercial repair resin. The resin may be used to perform minor repairs, such as filling in dents and holes in various structures, as well as extensive repairs. Typical applications may include automotive body repair, watercraft repair, repair of airplane paneling, furniture repair, household repairs and repair of sports equipment such as skis, surfboards and helmets. The resin may be used to repair any item or surface for which commercial repair resins are currently used. In addition, these materials can be used with traditional thermosetting vinyl and polyester resins to serve as gel coating matter providing a protective coating. Moreover, the resin may be used to repair military and marine equipment, such as weapons, armor metal structures, body paneling, platforms, support equipment, or any other military equipment or surface. The resin is particularly well suited to repairing equipment, items and surfaces. For example, it may be used to repair body panels and armor for vehicles, composite hoods and watercraft hull structures. The composite is envisioned to withstand paint adhesion testing, shaping and machining testing.

Figure 12:
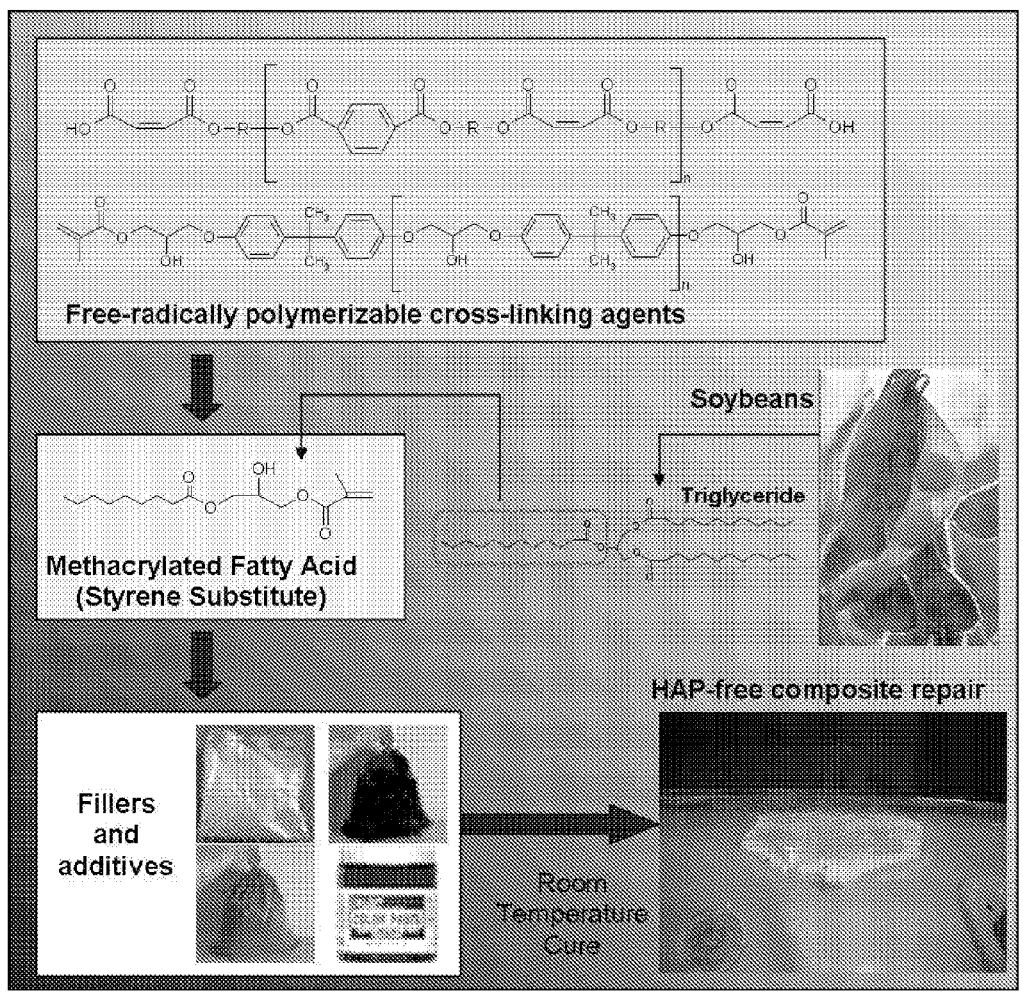
FIG. 12 is a flow chart for formulating a repair resin.

The invention is directed to a novel method for preparing resins having minimal or no HAPs or VOCs. As previously discussed, the composite resin comprises a mixture of three components: a resin binder, a hardener and filler. In a preferred embodiment, depicted in FIG. 12, the resin binder is first formulated by blending FAMs, including methacrylated fatty acid monomers, methacrylated fatty acid ester, and acrylated fatty acid ester, with VE or UPE monomers. The resin binder component preferably comprises from about 20-70% by weight of the composite resin, more preferably about 30-65% by weight of the composite resin, and most preferably 40-60% by weight of the composite resin. The hardener component, which comprises a free radical initiator and surfactants, is then mixed into the resin binder. In a preferred embodiment, the hardener is Bondo™ Red cream and constitutes 2% by weight of the composite resin curing within 30 minutes. Preferably, 0.1-10 wt % hardener is used. More preferably, 0.5-5 wt % hardener is used. Most preferably, 1-3 wt % hardener is used.

Zero and reduced VOC/HAP resin binders were prepared by blending MFA and styrene or other HAP or VOC monomer, such as styrene and methyl methacrylate, with VE and UPE monomers. These resin formulations contained about 0% to about 15% by weight styrene, which is a reduction compared to typical repair resins with about 15% to about 20% by weight styrene. Various compositions of VE/UPE and MFA monomers were used to make a variety of repair resin formulations. Dimethylaniline was added to the formulation to promote free radical cure of benzoyl peroxide initiators, which are typically used in the hardener component. Increasing the dimethylaniline content decreases the working time when using a given amount of a hardener component. Inorganic components, such as talc, chopped glass fibers, magnesium carbonate and/or sodium metaborate were thoroughly mixed into the resin formulations using high shear mixers. Various inorganic filler components, such as alumina, silica thickener/cabosil, glass microspheres and phenolic microballons, having various particle sizes were also incorporated in the composites. Table 1 discloses a variety of filler components, and preferred corresponding percent by weight ranges that may be incorporated as part of the resin binders. Inhibitors, such as hydroquinone, can also be added to the resin. These inhibitors will increase the working time, and if used at 0.5% by weight or less, will generally have little effect on the cured polymer appearance and properties. These resins may be cured in any suitable manner such as curing processes used to cure free-radically reactive systems, including, but not limited to thermal cure, room temperature cure, electron beam cure, and ultraviolet cure.

Similarly zero HAP composite resin binder formulations may also be prepared with various contents of MFA, VE, and dimethylaniline. The amounts of each of these components may be varied. Increasing the MFA content, reduces resin viscosity and also reduces the resin's $T_g$. Increasing the dimethylaniline content decreases the working time when using a given amount of a hardener component. The fillers acted similarly in increasing the viscosity of the uncured resin and increasing the stiffness of the cured polymer Inhibitors, such as hydroquinone, can also be added to the resin. These inhibitors will increase the working time, and if used at 0.5% by weight or less, will generally have little effect on the cured polymer appearance and properties. These resins may be cured in any way used to cure free-radically reactive systems, including, but not limited to thermal cure, room temperature cure, electron beam cure, and ultraviolet cure.

TABLE 1

|  | Embodiment 1 | Embodiment 2 | Embodiment 3 | Embodiment 4 | Embodiment 5 |
| --- | --- | --- | --- | --- | --- |
| Resin | 30-70 wt % | 35-60 wt % | 45-55 wt % | 30-70 wt % | 35-60 wt % |
| Talc | 0-50 wt % | 0-40 wt % | 15-35 wt % | 5-50 wt % | 10-40 wt % |
| magnesium carbonate | 0-50 wt % | 0-40 wt % | 15-30% wt % | 5-50 wt % | 10-40 wt % |
| sodium metaborate | 0-30% wt % | 0-20% wt % | 3-10% wt % | 1-30 wt % | 2-20% wt % |
| fibrous glass | 0-35% wt % | 0-25 wt % | 0-15 wt % |  |  |
| silica thickener | 0-30% wt % | 0-20% wt % | 0-15 wt % | 0-30 wt % | 0-20% wt % |
| glass microspheres | 0-10 wt % | 0-10% wt % | 0-10 wt % | 0-10% wt % | 0-10% wt % |
| phenolic microballoons | 0-10 wt % | 0-10% wt % | 0-10 wt % |  |  |
| alumina | 0-30 wt % | 0-10% wt % | 0-10 wt % |  |  |
| Sand | 0-30 wt % | 0-10% wt % | 0-10 wt % |  |  |

|  | Embodiment 6 | Embodiment 7 | Embodiment 8 | Embodiment 9 |
| --- | --- | --- | --- | --- |
| Resin | 45-55 wt % | 30-70 wt % | 35-60 wt % | 35-60 wt % |
| Talc | 15-35 wt % | 0-50 wt % | 10-40 wt % | 15-35 wt % |
| magnesium carbonate | 15-30 wt % | 0-50 wt % | 10-40 wt % | 15-30% wt % |
| sodium metaborate | 3-10 wt % | 5-35 wt % | 5-25 wt % | 5-20 wt % |
| fibrous glass |  |  |  |  |
| silica thickener | 0-5 wt % | 0-30 wt % | 0-20 wt % | 0-15% |
| glass microspheres | 0-10 wt % | 0-10 wt % | 0-25 wt % | 0-10 wt % |
| phenolic microballoons |  |  |  |  |
| alumina |  |  |  |  |
| Sand |  |  |  |  |

One factor in the fabrication of the composite resin is the synthesis of the FAM. A number of synthetic procedures can be employed for making fatty acid-based monomers for use as a reactive diluent in vinyl ester resins. FIG. 1 lists some of the synthetic routes that can be employed. In all of the synthetic routes, the starting materials are selected from triglycerides, shown in FIG. 1 (Known 0), fatty acids shown in FIG. 1 (Known 1a), fatty acid methyl esters shown in FIG. 1 (Known 2a), and cyclic fatty acids shown in FIG. 1 (Known 5). Refined plant oils contain approximately 99% triglyceride molecules. Industrially, fatty acids (FA) are produced from triglycerides by reaction with a strong acid, such as HCl. Fatty acid methyl esters (FAME) are produced by a methanolysis reaction. In this reaction, methanol replaces the glycerol ester linkages of the fatty acids under basic conditions. Cyclized fatty acids may be produced by reacting polyunsaturated fatty acids of triglycerides at high temperatures under basic conditions.

Figure 2:
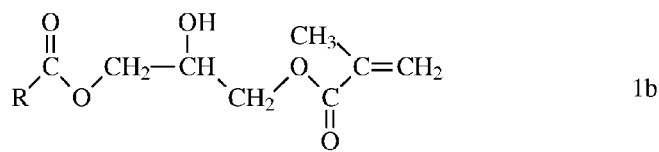
FIG. 2 shows the chemical structure for glycidyl methacrylate fatty acid adducts.

In synthetic Route 1b, fatty acids are reacted with an epoxy-vinyl species, such as glycidyl methacrylate (GM). The carboxylic acid group of each of the fatty acids adds to the epoxide group on glycidyl methacrylate. The resulting species of glycidyl methacrylate fatty acid may be a fairly long hydrocarbon, typically 12-26 atoms in length depending on the fatty acid used, with a terminal unsaturation site that is capable of free radical polymerization (FIG. 2). The length of the fatty acid chain affects the resin and polymer properties. Therefore, the particular fatty acid used has an effect on the polymer properties, thereby allowing customization of the polymer by selection of the fatty acid monomer(s).

Any fatty acid can be methacrylated using glycidyl methacrylate. For example, butyric acid, capric acid, caprylic acid, lauric acid, myristic acid, palmitic acid, stearic acid, oleic acid, and linoleic acid were all used as starting materials for such methracylation reactions. Mixtures of the fatty acids found in safflower oil were also used for methacrylation reactions.

Epoxides, such as glycidyl methacrylate, react with fatty acids at temperatures below 100° C. with short reaction times, if properly catalyzed. A chromium based catalyst, AMC-2™ (Aerojet Chemicals, Rancho Cordova, Calif.) has been successfully used to catalyze this reaction in amounts ranging from 0.5% to 2.0% by weight, based on the total weight of the reaction mixture.

Alternatively, 0.1-3.0 wt % of a 3:1 ratio of triphenyl antimony ($SbPh_3$) to triphenyl phosphine ($PPh_3$) catalyst can be used to catalyze the reaction of epoxides with fatty acids. Near IR or mid IR (FTIR) can be used to determine the extent of the reaction since the primary epoxide peaks at 4530 $cm^{-1}$ and 917 $cm^{-1}$ can be tracked during the reaction. When the reaction has gone to completion, the epoxide peaks disappear, indicating substantially complete consumption of the epoxide during the reaction.

In synthesis Route 2b, unsaturation sites on fatty acid methyl esters are first epoxidized, and then reacted with a vinyl carboxylic acid, such as acrylic acid or methacrylic acid. The resulting monomer FIG. 1 (Known 2b) includes an acrylate or methacrylate group, which is capable of free radically polymerizing, in the middle of a long hydrocarbon chain (20 atoms long). Ideally, this monomer will have only a single acrylate group. For this to be the case, monounsaturated fatty acids need to be used. Pure mono-unsaturated acids are fairly expensive. Canola oil and olive oil are relatively inexpensive sources of mono-unsaturated acids, but they each have significant contents of saturated and polyunsaturated acids. The preparation of acrylated epoxidized fatty acid methyl esters is described elsewhere.

Figure 3A:
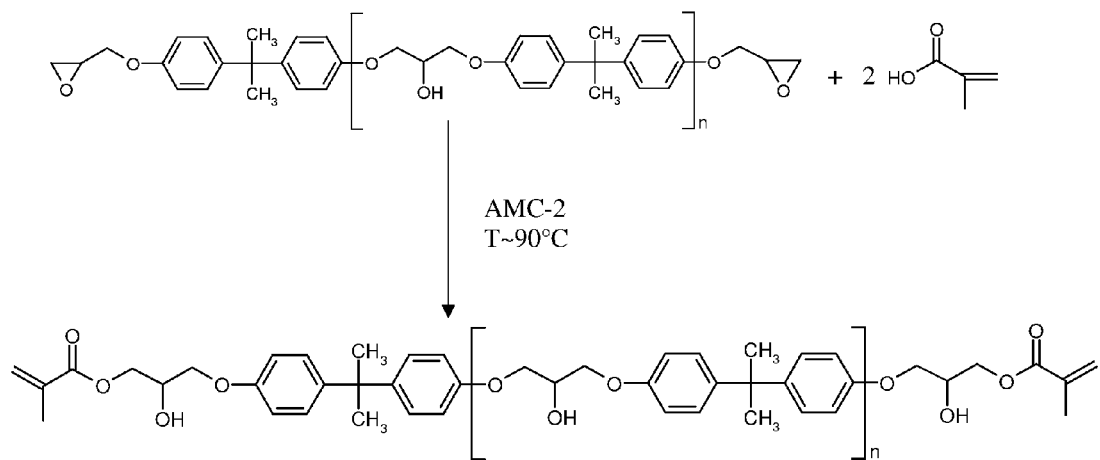
FIGS. 3(a)-3(b) show the chemical structure for di-functional monomers: 3(a) vinyl esters, and 3(b) unsaturated polyesters, which are the most common cross-linking agents for repair resins.
Figure 3B:
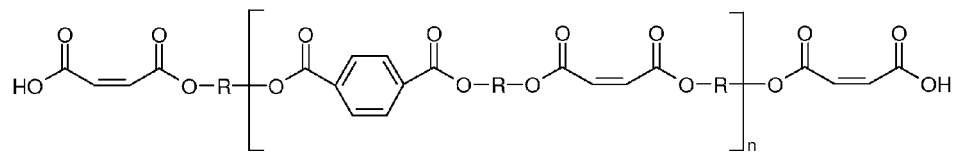
Figure 4:
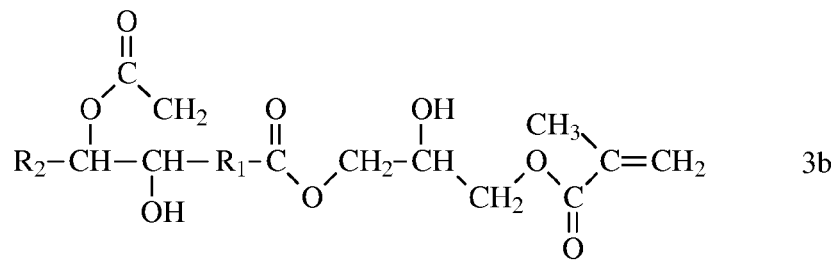
FIG. 4 shows the chemical structure for free-radically reactive fatty acids.

Di-functional monomers can be used to improve the properties of vinyl ester resins by providing additional cross-linking as well as decreasing the amount of unreacted monomer in the cured polymer. Synthesis Route 3 shows a way to produce di-functional monomers FIG. 3 by combining the synthetic procedures of synthesis Routes 1 and 2. Free-radically reactive fatty acids FIG. 4 are an intermediate, which are believed to be novel. These species can be used to create free-radically reactive surfactants by simple addition of the free-radically reactive fatty acid with aqueous sodium bicarbonate.

Figure 5:
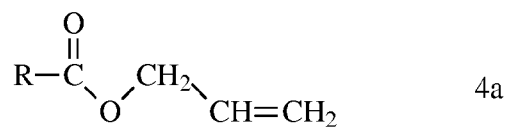
FIG. 5 shows the chemical structure for allyl fatty acid monomers.
Figure 6:
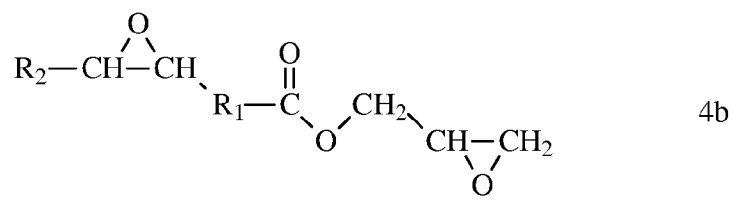
FIG. 6 shows the chemical structure for fatty acids with both primary and secondary epoxide groups.
Figure 7:
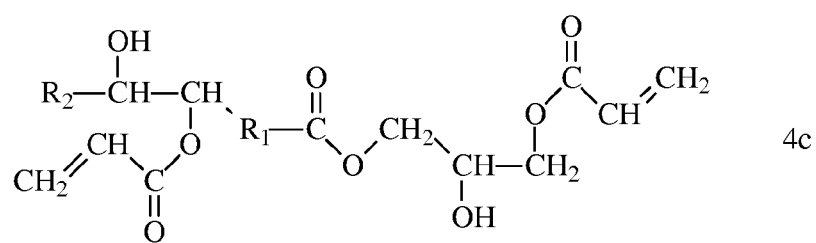
FIG. 7 shows the chemical structure for fatty acids with free-radical functionality at both the center and end of the fatty acid chains.

Allyl alcohol (AOH) is used to break up the triglycerides into allyl fatty acid monomers FIG. 5 in a procedure that is very similar to the methanolysis reaction. These monomers (AOH-FA) have a primary unsaturation site that could potentially be used for free radical polymerization. In addition, the unsaturation site can be epoxidized to form fatty acids with both primary and secondary epoxide groups FIG. 6. This product can be used as an epoxy chemical for various applications, such as a chain extender in epoxy resins. In addition, the epoxide groups can be reacted with a vinyl acid, such as acrylic acid, to yield fatty acids with free-radical functionality at both the center and end of the fatty acid chains FIG. 7.

Allyl alcohol was used to break apart the glycerol linkage of triglycerides in soybean oil to produce allyl alcohol modified fatty acids (AOH-FA) (Product 4a). The reaction mixture contained 70 g oil (soybean oil), 22 ml allyl alcohol, and 25.5 ml of a 0.5 N KOH/allyl alcohol solution. The contents were mixed and reacted at 60° C. for 3 days. Afterwards, the reaction products were recovered using an ether extraction, as for the methanolysis reaction. The level of functionalization with allyl alcohol was measured using $^1H$-NMR. Results have shown that the allyl alcoholysis reaction proceeds to about 80% completion. Other plant oils, including olive oil and canola, were modified in the same manner with the same results. Therefore, this method can be applied to all triglyceride oils. Epoxidation of the allyl unsaturation sites can be done using peroxyacetic acid or transition metal complexes, as described elsewhere.

Figure 8:
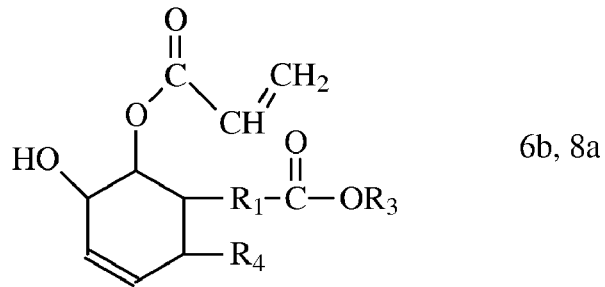
FIG. 8 shows the chemical structure for a cyclized fatty acid or fatty acid ester monomer with free-radical functionality attached to the cyclic group via epoxidation then acrylation of remaining unsaturation sites.
Figure 9:
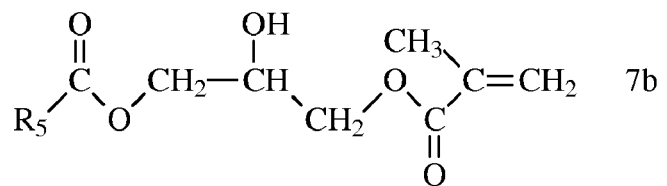
FIG. 9 shows the chemical structure for a cyclized fatty acid monomer-glycidyl methacrylate adduct where $R_5$ is an unsaturated cyclic alkyl residue having 10-50 carbon atoms.
Figure 10:
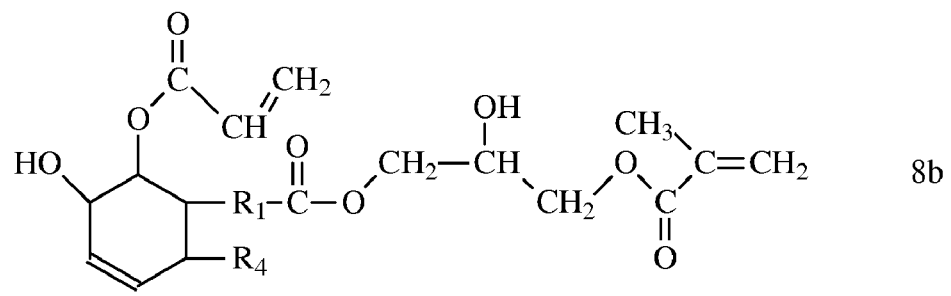
FIG. 10 shows the chemical structure for di-vinyl, cyclized fatty acid monomers.

Synthetic Routes 6-8 make use of the cyclized derivatives of triglycerides. In synthetic Route 6, a methyl ester of the cyclized species is formed via methanolysis FIG. 1 (Known 6a). The remaining unsaturation sites on the fatty acid are then epoxidized and acrylated to add free radical functionality to the fatty acid FIG. 8. In Route 7, cyclized fatty acids are produced by acidolysis of cyclized triglycerides FIG. 1 (Known 7a). This species is then reacted with glycidyl methacrylate, in the same manner as Route 1, to attach vinyl functionality to the end of the cyclized fatty acid (FIG. 9). Route 8 is just a combination of Routes 6 and 7, resulting in di-vinyl, cyclized fatty acid monomers FIG. 10.

The fatty acids employed to make the fatty acid monomers of the invention can be obtained from any suitable source of triglycerides. Suitable renewable plant sources of fatty acids include, but are not limited to, almond seed oil, arachis (groundnut) oil, canola oil, castor oil, catnip oil, cedarwood oil, citronella oil, coprah oil, corn oil, cottonseed oil, garlic oil, jojoba oil, linseed oil, neem oil, olive oil, palm oil, palm kernal oil, peanut oil, perilla oil, rapeseed oil, rice bran oil, safflower oil, sesame oil, soja oil, soybean oil, sunflower oil, tall oil, tung oil, butter, lard, tallow, vernonia, yellow grease, camelina, carthame, grape seed, hazelnut, poppy seed oil, walnut oil, avocado pear, black-currant, borage, cacao, evening primrose, kukui oil and wheat germ oil.

Exemplary classes of fatty acids that may be employed to make the fatty acid monomers of the present invention include, but are not limited to, straight chain fatty acids, branched chain fatty acids, and ring containing fatty acids. Straight chain fatty acids include saturated fatty acids, monoenoic fatty acids, polyenoic fatty acids, acetylenic fatty acids, hydroxy fatty acids, dicarboxylic fatty acids, divinyl ether fatty acids, sulfur-containing fatty acids, fatty acid amides, methoxy fatty acids, keto fatty acids, and halogenated fatty acids. Branched chain fatty acids include branched alkyl fatty acids, branched methoxy fatty acids and branched hydroxy fatty acids (mycolic acids). Ring-containing fatty acids include cyclopropane fatty acids, cyclopentenyl fatty acids, furanoid fatty acids, cyclohexyl fatty acids, phenylalkanoic fatty acids, epoxy fatty acids and lipoic fatty acids.

Exemplary fatty acids that may be employed to make the fatty acid monomers of the present invention, include, but are not limited to, butyric acid, capric acid, caprylic acid, lauric acid, myristic acid, palmitic acid, stearic acid, oleic acid and linoleic acid.

These fatty acid monomers were designed to replace some or all of the high VOC chemicals (e.g., styrene) that are typically employed in thermosetting liquid molding resins. Fatty acid monomers have low volatilities, low cost, low viscosities, and are reactive with other vinyl monomers. Therefore, these monomers are ideal as replacements for styrene in vinyl ester, unsaturated polyester, and other thermosetting liquid molding resins.

EXAMPLES

Examples of Fatty Acid Monomer Synthesis

Example 1

The reaction between a stoichiometric amount of oleic acid (OA) and glycidyl methacrylate (GM) was catalyzed with 2 wt % AMC-2™ catalyst and run at room temperature. The reaction went to ~90% completion after 3 days of reaction.

Examples 2-4

The reaction between a stoichiometric amount of oleic acid and glycidyl methacrylate was catalyzed with 0.5 wt %, 1 wt %, and 2 wt % AMC-2™ catalyst and run at 70° C. The reaction went to completion in 1.5 hrs when 2 wt % catalyst was used. The reaction went to completion after 2.5 hours when 1 wt % catalyst was used. When 0.5 wt % catalyst was used, the reaction took longer than 4 hours.

Examples 5-7

The effect of higher reaction temperatures on the reaction of oleic acid and glycidyl methacrylate was studied using 1 wt % AMC-2™ catalyst. Reaction temperatures of 80° C., 90° C., and 100° C. were used. It was found that increasing temperature decreased the reaction time necessary to reach complete reaction of the epoxides. However, at 100° C., HPLC results show the formation of some higher molecular weight species. This indicates that undesirable epoxy homopolymerization (etherification) occurred to some extent at 100° C.

Example 8

The $SbPh_3/PPh_3$ catalyst also effectively catalyzed the acid-epoxy reaction between fatty acids and glycidyl methacrylate. For the reaction of glycidyl methacrylate with oleic acid using 1 wt % of this catalyst mixture, the reaction went to completion after 5 hours of reaction at 70° C.

In order to simultaneously minimize the catalyst concentration and reaction time, 0.5-2.0 wt % of a suitable catalyst such as AMC-2™ may be employed, whereas use of 1 wt % AMC-2™ was found to be optimum for the reaction of glycidyl methacrylate and oleic acid. Reaction temperatures ranging from 60-90° C. were found to maximize the extent of reaction while minimizing the extent of side reactions.

Examples 9-14

Glycidyl methacrylate was reacted with stoichiometric amounts of lauric acid, stearic acid, oleic acid, linoleic acid, linolenic acid, and a mixture of the fatty acids of safflower oil using 1 wt % AMC-2™ at reaction temperatures ranging from 60-90° C. The conversion of the reactants to the desired product was nearly complete (>95%). HPLC results showed that substantially no higher molecular weight species were formed. In addition, $^1$H-NMR confirmed the structure and functionality of these methacrylated fatty acids. This demonstrates to a skilled person that any fatty acid can be successfully modified in this manner to produce a fatty acid monomer.

Example 15

Methacrylated lauric acid was prepared by reacting 5897 g lauric acid with 4166 g glycidyl methacrylate in the presence of 51 g AMC-2 catalyst. The reaction was run in a 20 L vessel while stirring vigorously with a mechanical stirrer. The reaction was run at 50° C. for 16 hrs. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycidyl methacrylate. NMR showed than no epoxies remained, while 0.98 methacrylate groups were present per fatty acid segment. The viscosity was 48 cP at 30° C. using a Brookfield Viscometer.

Example 16

Methacrylated oleic acid was prepared by reacting 108.1 g oleic acid with 54.4 g glycidyl methacrylate in the presence of 1.6 g AMC-2 catalyst. The reaction was run at 55° C. for 3.5 hrs and then for 2.5 hrs at 70° C. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycidyl methacrylate. NMR showed than no epoxies remained, while 0.98 methacrylate groups were present per fatty acid segment. The viscosity was 60 cP at 30° C. using a Brookfield Viscometer.

Example 17

Methacrylated butyric acid was prepared by reacting 57.4 g butyric acid with 92.6 g glycidyl methacrylate in the presence of 1.5 g of AMC-2 catalyst. The reaction was run at 90° C. for 3 hours. The product was a green liquid. Acid number titration showed that little unreacted fatty acids remained, as the acid number was less than 5. FTIR results showed that the epoxy group of glycidyl methacrylate at 910 $cm^{-1}$ was gone. HPLC results showed that the complete conversion of the methacrylated butyric acid. The viscosity of methacrylated butyric acid was found to be 24 cps at 24° C. using a Brookfield viscometer.

Example 18

10 g methacrylated oleic acid was placed in a 20 mL vial, with the lid screwed on tightly. The sample was allowed to sit for 2.5 years at room temperature in a dark cabinet. During this time, gelation did not occur.

Example 19

Methyl oleate in the amount of 63.1 g was epoxidized in the presence of 64.35 g hydrogen peroxide (30% aqueous) and 20.7 g formic acid. The reaction was allowed to run for 16 hrs while mechanically mixing. The epoxidized oil was ether extracted. The ether was evaporated under vacuum at 40° C. NMR results show that the extent of epoxidation was 0.94 epoxies per fatty acid methyl ester. The product was a white solid-liquid mixture.

Example 20

62.43 g of the epoxidized methyl oleate in example 19 were reacted with 19.74 g acrylic acid at 85° C. for 6 hrs. AMC-2 catalyst and hydroquinone were used in the amounts of 1.25 g and 0.199 g, respectively. The product was ether extracted to remove hydroquinone and unreacted acrylic acid. The ether was evaporated at 40° C. under vacuum. NMR results showed the extent of acrylation was 0.90 based on the initial level of unsaturation (i.e., 0.9 acrylates per molecule). The viscosity was 56 cP at 30° C. using a Brookfield Viscometer. The product was a brown-green liquid.

Example 21

10 g of the product from example 17 was epoxidized using 5.35 g hydrogen peroxide (30 wt % aqueous) and 3.33 g formic acid, along with 0.01 g hydroquinone to reduce the likelihood of polymerization. The reaction was allowed to run for 16 hours, at room temperature while mechanically mixing. The epoxidized oil was ether extracted. The ether was evaporated under vacuum at 40° C. NMR results showed that the extent of epoxidation was 0.8 epoxies per fatty acid. 9.0 g of epoxidized product was reacted with 1.68 g acrylic acid, in the presence of 0.21 g AMC-2 and 35 mg hydroquinone. The product was ether extracted, and the ether was evaporated under vacuum at 40° C. The product contained 0.25 acrylates and 0.95 methacrylates per fatty acid. The resulting monomer was a brown-green liquid.

Example 22

Alcoholoysis of soybean oil was run using allyl alcohol. 60.0 g of soybean oil was reacted with 22.1 mL allyl alcohol plus 18.3 mL 0.5 N potassium hydroxide in allyl alcohol. The reaction was run at 62° C. for 4 days. The products were separated using an ether extraction. The ether was evaporated at 40° C. under vacuum. NMR showed that the final product had 0.82 allyl groups per fatty acid. The viscosity was 10 cP at 30° C. using a Brookfield Viscometer. The final monomer was a yellow low viscosity liquid.

Example 23

2.0 g linseed oil were reacted with a mixture of 8.2 g ethylene glycol and 2.0 g potassium hydroxide at 240° C. for 3 days. The final product was ether extracted and the ether was evaporated under vacuum at 40° C. NMR showed that there were 2.05 unsaturation sites per fatty acid and an extent of cyclization of 4%. The product was an orange-brown liquid.

Novel fatty acid monomers in accordance with the present invention may be selected from those shown in FIGS. 2-10, wherein R, $R_2$, and $R_4$ are any fatty acid residue, specifically including any $C_2$-$C_{30}$ saturated alkyl residue, unsaturated alkyl residue; acetylenic alkyl residue, hydroxy alkyl residue, carboxylic acid alkyl residue, divinyl ether alkyl residue, sulfur-containing alkyl residue, amide alkyl residue, methoxy alkyl residue, keto alkyl residue, halogenated alkyl residue, branched methoxy alkyl residue, branched hydroxyl alkyl residue, epoxy alkyl residue, and fatty acyl-CoA alkyl residue, ring-conatining alkyl residue, including cyclopropane alkyl residues, cyclopentenyl alkyl residues, cyclohexyl alkyl residues, furanoid alkyl residues, phenylalkanoic alkyl residues, and lipoic alkyl residues.

$R_1$ is any fatty acid segment, specifically including any saturated alkylene segment, unsaturated alkylene segment; acetylenic alkylene segment, hydroxy alkylene segment, divinyl ether alkylene segment, sulfur-containing alkylene segment, amide alkylene segment, methoxy alkylene segment, keto alkylene segment, halogenated alkylene segment, branched methoxy alkylene segment, branched hydroxyl alkylene segment, epoxy alkylene segment, and fatty acyl-CoA alkylene segment, ring-conatining alkylene segment, including cyclopropane alkylene segments, cyclopentenyl alkylene segments, cyclohexyl alkylene segments, furanoid alkylene segments, phenylalkanoic alkyl segments, and lipoic alkylene segments of backbone lengths from 1-25 atoms. $R_3$ is selected from the group consisting of H and an alkyl residue having 1-10 carbon atoms. $R_5$ is an unsaturated cyclic alkyl residue having 10-50 carbon atoms and with $R_1$ and $R_4$ functionality.

All of the various aspects of the invention may also employ a free-radical inhibitor, such as hydroquinone, to reduce or prevent gelation of the reaction mixture Examples of the Preparation of Vinyl Ester Example 24

Viny ester (VE) was prepared via methacrylation of Epon 828™. 525.7 g Epon 828™ resin was reacted with 243.5 g methacrylic acid. AMC-2 was used as a catalyst for the reaction and to prevent epoxy homopolymerization in the amount of 7.6 g. The reaction was run at about 90° C., but water was periodically flowed through cooling coils within the reactor to keep the temperature below 95° C. After 1 hr and 47 minutes, the acid number of a sample of the reaction contents was found to be 8, and FTIR indicated that there was no peak at 910 $cm^{-1}$, indicating that all of the epoxy reacted. NMR results showed that there were two methacrylate groups per molecule of Epon 828™ resin. GPC results indicated a large single vinyl ester peak at 14.45 min and a small peak at 18.5 minutes representing catalyst, impurities, and unreacted methacrylic acid. The product was a viscous green liquid.

Example 25

Acrylated epoxy (VEA) was prepared via acrylation of Epon 828™. 401.1 g Epon 828™ resin was reacted with 160.0 g acrylic acid. AMC-2 was used as a catalyst for the reaction and to prevent epoxy homopolymerization in the amount of 5.6 g. The reaction was run at about 90° C., but water was periodically flowed through cooling coils within the reactor to keep the temperature below 95° C. After 1 hr and 20 minutes, the acid number of a sample of the reaction contents was found to be 2.6, and FTIR indicated that there was no peak at 910 $cm^{-1}$, indicating that all of the epoxy reacted. NMR results showed that there were two acrylate groups per molecule of Epon 828™ resin. The product was a viscous green liquid.

All of the various aspects of the invention may also employ a free-radical inhibitor, such as hydroquinone, to reduce or prevent gelation of the reaction mixture Examples of Resins and Polymerization Reactions

Example 26

Methacrylated lauric acid monomer from example 15 in the amount of 10.85 g was catalyzed with 0.039 g cobalt naphthenate and 0.169 g Trigonox®. The resin was cured at room temperature for 3 hrs, followed by 3 hrs at 90° C. The resulting clear green polymer was flexible and soft. DMA results showed that the $T_g$ of the resulting polymer is −30° C.

Example 27

7.76 g of the methacrylated lauric acid monomer in example 15 was added to 14.39 g vinyl ester in example 24. The resin viscosity was 1720 cP at 30° C. as measured with a Brookfield Viscometer.

Example 28

33.0 g of the methacrylated fatty acid monomer in example 15 was added to 61.2 g vinyl ester in example 24, making resin with a composition of VE/MLau 65/35. The resin was catalyzed with 0.35 g Cobalt naphthenate and 1.41 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 2.0 GPa at 35° C. and a $T_g$ of 79° C. Fracture toughness measurements resulted in an average $G_{IC}$ of 145 J/m². Flexural testing resulted in a modulus a 2.6 GPa and strength of 82 MPa.

Example 29

2.46 g of the methacrylated fatty acid monomer in example 16 was added to 4.57 g vinyl ester in example 24. The resin was initiated with 0.113 g Trigonox®. The resin was poured into a plastic mold and allowed to cure at 90° C. for 2 hrs. The resulting samples were hard and rigid. The samples were then postcured at 5° C./min to 180° C. DMA results indicated the sample had a modulus of 2.1 GPa at 35° C. and a $T_g$ of 94° C.

Example 30

2.716 g of the methacrylated fatty acid monomer in example 15 was added to 5.047 g vinyl ester in example 24. The resin was poured into a circular plastic mold and was electron beam irradiated for 2 minutes with a dosage of 3.5 MRad. The resin cured during this irradiation to form a stiff and hard polymer, but was then immediately postcured at 85° C. for 1 hr. DMA results indicated the sample had a modulus of 2.2 GPa and a $T_g$ of 105° C.

Example 31

10.82 g of the methacrylated fatty acid monomer in example 15 was added to 13.23 g vinyl ester in example 24. The resin viscosity was 792 cP as measured with a Brookfield viscometer.

Example 32

42.52 g of the methacrylated fatty acid monomer in example 15 was added to 51.97 g vinyl ester in example 24, making resin with a composition of VE/MLau 55/45. The resin was catalyzed with 0.35 g Cobalt naphthenate and 1.43 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 1.5 GPa at 35° C. and a $T_g$ of 71° C. Fracture toughness measurements resulted in an average $G_{IC}$ of 186 J/m². Flexural testing resulted in a modulus a 1.9 GPa and strength of 61.5 MPa.

Example 33

The VE/MLau resin from example 15 was placed in a 20 mL vial, with the lid screwed on tightly. The sample was allowed to sit for 2 years at room temperature in a dark cabinet. During this time, gelation did not occur.

Example 34

5 grams of methacrylated lauric fatty acid monomer (example 15) was added to 4 grams of methacrylated butyric fatty acid monomer (example 17) and 11 grams of vinyl ester resin in Example 24. The resin was catalyzed with 0.3 grams of Trigonox® and 0.075 grams of Cobalt naphthenate. The resin was poured into a plastic cylindrical mold and allowed to cure at room temperature for 16 hours. The resulting samples were hard and rigid. The samples were then postcured at 2° C./min to 180° C. DMA results indicated the sample had a modulus of 3.55 GPa and Tg of 77° C.

Example 35

33.36 g of the methacrylated fatty acid monomer in example 15 was added to 61.95 g acrylated vinyl ester in example 25, making resin with a composition of VE/MLau 55/45. The resin was catalyzed with 0.35 g Cobalt naphthenate and 1.44 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 1.56 GPa at 35° C. and a $T_g$ of 76.5° C. Fracture toughness measurements resulted in an average $G_{IC}$ of 105 J/m².

Example 36

10.54 g of the methacrylated oleic acid monomer in example 15 was added to 19.57 g vinyl ester in example 24. The resin viscosity was 2000 cP as measured with a Brookfield viscometer.

Example 37

85.7 g of the methacrylated fatty acid monomer in example 16 was added to 104.7 g acrylated vinyl ester in example 25, making resin with a composition of VE/MOA 55/45. The resin was catalyzed with 0.70 g Cobalt naphthenate and 2.8 g Trigonox®. The resin was poured into a rectangular metal mold and allowed to cure at room temperature for 16 hrs. The resulting samples were hard and rigid. The samples were then post-cured at 130° C. for 4 hours. DMA results indicated the sample had a modulus of 1.1 GPa at 35° C. and a $T_g$ of 75° C. Fracture toughness measurements resulted in an average $G_{IC}$ of 116 J/m².

Example 38

8.61 g vinyl ester from example 24 was blended with 3.31 g MOA from example 16 and 1.35 g styrene to make a resin with composition VE/MOA/Styrene 65/25/10. The resin viscosity was measured with a Brookfield viscometer and found to be 496 cP at 30° C.

Example 39

116.9 g vinyl ester from example 24 was blended with 45.0 g MOA from example 16 and 18.0 g styrene to make a resin with composition VE/MOA/Styrene 65/25/10. The resin was catalyzed with 0.68 g cobalt naphthenate and 2.7 g Trigonox®. The resin was poured into a metal rectangular mold and allowed to cure for 16 hrs at room temperature. The resulting polymer was hard and rigid and was clear and green in color. The surface finish of the sample was excellent. All surfaces were smooth and hard with no tackiness. The sample was post-cured at 130° C. for 4 hours. The $T_g$, as measured with DMA, was 118° C. The flexural modulus was 3.12 GPa and the flexural strength was 104 MPa. The fracture toughness was measured to be 147 J/m$^2$.

Example 40

2.625 g vinyl ester from example 24 was blended with 0.96 g MLau from example 15 and 1.19 g styrene to make a resin with composition VE/MLau/Styrene 55/20/25. The resin viscosity was measured to be 88 cP as measured with A TA Instruments AR2000 Rheometer.

Example 41

51.66 g vinyl ester from example 24 was blended with 23.54 g MLau from example 15 and 18.8 g styrene to make a resin with composition VE/MLau/Styrene 55/25/20. The resin was catalyzed with 0.35 g cobalt naphthenate and 1.37 g Trigonox®. The resin was poured into a metal rectangular mold and allowed to cure for 16 hrs at room temperature. The resulting polymer was hard and rigid and was clear and green in color. The surface finish of the sample was excellent. All surfaces were smooth and hard with no tackiness. The sample was post-cured at 130° C. for 5 hours. The Tg, as measured with DMA, was 104° C. The flexural modulus was 3.02 GPa and the flexural strength was 106 MPa. The fracture toughness was measured to be 224 J/m$^2$.

Example 42

5.2 g vinyl ester was blended with 4.25 g acrylated oleic methyl ester. The resin formed a homogeneous solution. The resin viscosity was 1300 cP as measured with a Brookfield viscometer.

Example 43

1.31 g vinyl ester was mixed with 0.653 g acrylated oleic methyl ester. The reaction was catalyzed with 0.01 g cobalt naphthenate and 0.037 g Trigonox®. The resin was cured at room temperature and gelled within 1 hr, but was allowed to cure for 16 hrs. The resulting polymers formed a clear, yellow-green colored hard rigid solid. The resulting polymer had a $T_g$ of 67° C. and a modulus of 1.1 GPa.

Example 44

10.19 g vinyl ester from example 24 was blended with 5.49 g monomer from example 22. The resin formed a clear yellow-green homogeneous solution. The resin viscosity was 356 cP using a Brookfield Viscometer.

Example 45

1 g vinyl ester was mixed with 0.653 g acrylated oleic methyl ester. The reaction was catalyzed with 0.01 g cobalt naphthenate and 0.037 g Trigonox®. The resin was cured at room temperature and gelled within 1 hr, but was allowed to cure for 16 hrs. The resulting polymers formed a clear, yellow-green colored hard rigid solid. The resulting polymer had a $T_g$ of 67° C. and a modulus of 1.1 GPa.

Example 46

Oleic acid was reacted with an equimolar ratio of $Br_2$ to form 9-10 di-bromo stearic acid (Di-BrSA). In a simple procedure 20 g oleic acid (0.07 mole) was reacted with 11.32 g (0.07 mole) of bromine at room temperature. Bromine was added slowly in aliquots to prevent the excessive heating caused by the exothermic addition reaction. The red brown color of bromine instantly disappeared as bromine was added leading into a light orange colored solution. The solution was stirred at room temperature for an hour to ensure the completion of reaction. The $^1$H-NMR spectral analysis of this product indicated the disappearance of the 5.35 ppm peaks that represent the vinyl protons of oleic acid and the appearance of the 4.10-4.50 ppm peaks that represent the methylene protons attached to Br, confirming the complete reaction of the double bonds of oleic acid with $Br_2$. The viscosity of 9-10 di-bromo stearic acid was 463 cP at 25° C., considerably higher than that of oleic acid (24 cP).

Example 47

9-10 di-bromo stearyl glycidyl methacrylate (Di-BrSAGMA) was prepared by reacting 9-10 di-bromo stearic acid with an equimolar ratio of glycidyl methacrylate. 31.32 g (0.07 mole) Di-BrSA as prepared in Example 46 was reacted with 10.07 g (0.07 mole) glycidyl methacryate in the presence of 1 wt % AMC-2 as catalyst and 0.01 wt % hydroquinone. The reaction was run for 2.5 hours at 70° C. The IR spectrum of the product showed the disappearance of the 4530 cm$^{-1}$ epoxide peaks and also the replacement of the broad carboxylic acid band of oleic acid by the 3468 cm$^{-1}$ hydroxyl band. The $^1$H-NMR spectral analysis of this product indicated reaction of all the acid functionality with glycidyl methacrylate. The resulting monomer was a green colored liquid with a viscosity of 834 cP at 25° C.

VE(828)(65 wt %)/Di-BrSAGMA(35 wt %) polymers cured at room temperature in presence of 1.5 wt % Trigonox® 239A, 0.0375 wt % Cobalt naphthanate, post-cured at 120° C. for 2 hours and at 160° C. for 2 hours, exhibited a storage modulus value of 0.53 GPa at 30° C. and a $T_g$ of 60° C. VE(828)(55 wt %)/Di-BrSAGMA(20 wt %)/Styrene(25 wt %) polymers cured at room temperature and postcured with a 5° C./min temperature ramp from room temperature to 200° C., exhibited a storage modulus value of 2.73 GPa at 30° C. and a $T_g$ of 104.3° C.

Examples 48-51

The viscosities of fatty acid-based vinyl resins containing 35 wt % and 45 wt % fatty acid monomer were measured at 30° C. Cobalt Napthenate (CoNap) and Trigonox® (45% cumene hydroperoxide) were used to cure the resins. 1.5 wt % Trigonox® and 0.375 wt % CoNap, based on the total resin mass, were used. The viscosities of the resins, before cure, ranged from 700-2500 cP. The viscosity of the resins increased with chain length and decreased as the level of unsaturation along the fatty acid backbone decreased. The level of unsaturation affected the viscosity because these sites caused kinks in the fatty acid chain and increased the intermolecular spacing.

Example 52

A resin was prepared by mixing 7.415 g of the vinyl ester resin prepared in example 15 with 4.471 g MOA prepared in example 16 and 2.963 g styrene. A sample from this resin was placed in a thermogravimetric analyzer. The mass loss resulting from styrene evaporation was measured as a function of time for 3 days at 40° C. The mass loss of amounted to only 20% of the initial sample mass, while the mass loss of high volatility commercial resins was 30-40% of the initial styrene mass.

Example 53

A resin was prepared by mixing 2148.8 g of a resin prepared in a manner similar to that in example 24 with 496.0 g the MLau prepared in example 15. Styrene in the amount of 662.1 g was added to the resin. 0.495 g hydroquinone was added in addition to 1.05 g cobalt naphthenate, followed by 7.4 g Trigonox®. A composite was prepared with 20 layers of 8 oz. E-glass universally sized woven mats using vacuum assisted resin transfer molding. The resin filled the part in less than 15 minutes. The sample was allowed to cure under vacuum all night. The finished part was hard and stiff, green in color and nearly clear.

Examples 54-55

Ternary blends of VE, FA monomer, and reactive diluents were also studied. In the ternary blends of fatty acid monomers, vinyl esters and reactive diluents, any conventional reactive diluents may be employed. Generally, any low viscosity monomer with a single, free-radically polymerizable group can be employed as a reactive diluent. Exemplary reactive diluents include, but are not limited to, styrene, orthomethylstyrene, para-methylstyrene, 2-hydroxymethacrylate, methyl methacrylate, ethyl methacrylate, butyl methacrylate, methyl acrylate, cyclohexyl methacrylate, and isobornyl methacrylate.

The viscosity of VE/GM-FA/styrene was measured at 30° C. and was found to decrease exponentially with styrene content for resins containing 55 wt % and 65 wt % Epon 828™ resin Styrene contents of 8% or greater reduced the viscosity of VE resins to the acceptable range (<500 cP). Therefore, only low styrene contents are necessary, from a viscosity viewpoint. Thus, the amount of styrene in thermosetting resins can be greatly reduced by also using fatty acid monomers as reactive diluents.

The gelation behavior of these resins was similar to commercial thermosetting resins. The viscosity decreased slightly at low cure times because of external and internal (i.e. as a result of the reaction) heating. Then the viscosity increased drastically as gelation began to occur.

FTIR showed that the structure of the fatty acid monomer had a large effect on the cure kinetics. The cure rate of vinyl functional fatty acids (acrylated fatty acids and glycidyl methacrylate-fatty acid) decreased as the number of residual unsaturation sites on the fatty acid chain increased. For example, glycidyl methacrylate modified stearic acid cured faster and to a higher extent than glycidyl methacrylate modified linoleic acid. Therefore, the time for complete cure depends on the particular fatty acid used as well as the reaction temperature. For fatty acids with 0 or 1 residual unsaturation sites on the backbone, the time for complete cure is less than 1 hour at room temperature and less than 30 minutes at 90° C. The extents of reaction of the VE monomers are greater than 70%, which is greater than that of commercial resins. In addition, the extent of reaction of the fatty acid monomers is greater than 85%, which is slightly lower than the extent of reaction of styrene in many commercial VE and unsaturated polyester resins.

AOH-FA monomers do not cure to a large extent with VE. However, the VE monomer cures to greater than 80%, which is higher than the extent of cure of VE with styrene. Furthermore, the rate of cure is slow. Complete conversion required 3 weeks at room temperature.

Example 56

The properties of VE/FA polymer were measured using dynamic mechanical analysis (DMA) at 1 Hz. The polymer samples were cured at room temperature using CoNap and Trigonox® and post-cured with a 5° C. temperature ramp from room temperature to 200° C. The moduli ranged from 1-1.8 GPa and the glass transition temperature ($T_g$) ranged from 65-90° C. When the resins were cured at 90° C. and post-cured using a temperature ramp, the final properties improved. The moduli ranged from 1.5-2 GPa with $T_g$ ranging from 70-95° C. The range of properties was due to the use of a number of different fatty acids in these reactions. Both $T_g$ and the modulus increased as the fatty acid chain length decreased. This was expected because longer fatty acid chains increase the free volume of the polymer. The rubber moduli of the polymers were ~45 MPa, indicating the molecular weight between cross-links, $M_c$, was ~250 g/mol. According to rubber elasticity theory, $M_c$ should be 280 g/mol and 300 g/mol for 35% and 45% FA monomer, respectively, which is in good agreement with the results. This indicates that the conversion of monomer to polymer was high.

Example 57

Various zero HAP/VOC composite resins incorporating fatty acid monomers were tested to determine their material and mechanical properties. The resins included 0.2% by weight dimethylanaline and various inorganic fillers. Some resins were formulated to have similar properties as that of Bondo™. Others were prepared with higher or lower thermal and mechanical properties, which would be useful for repairs for which Bondo™ is unsuitable.

The viscosities of the resin formulations were measured using a TA instruments (New Castle, Del.) AR2000 rheometer in steady shear flow experiments to prove that the resins have Newtonian behavior. The shear rate was increased from 0.001 $s^{-1}$ to 10 $s^{-1}$ and then decreased back to 0.001 $s^{-1}$ and 5 measurements were taken per decade of shear rate. At a given shear rate, the shear stress was measured every two seconds. The shear rate and viscosity were recorded when the shear rate stabilized to within 5% tolerance for three consecutive points.

Figure 13:
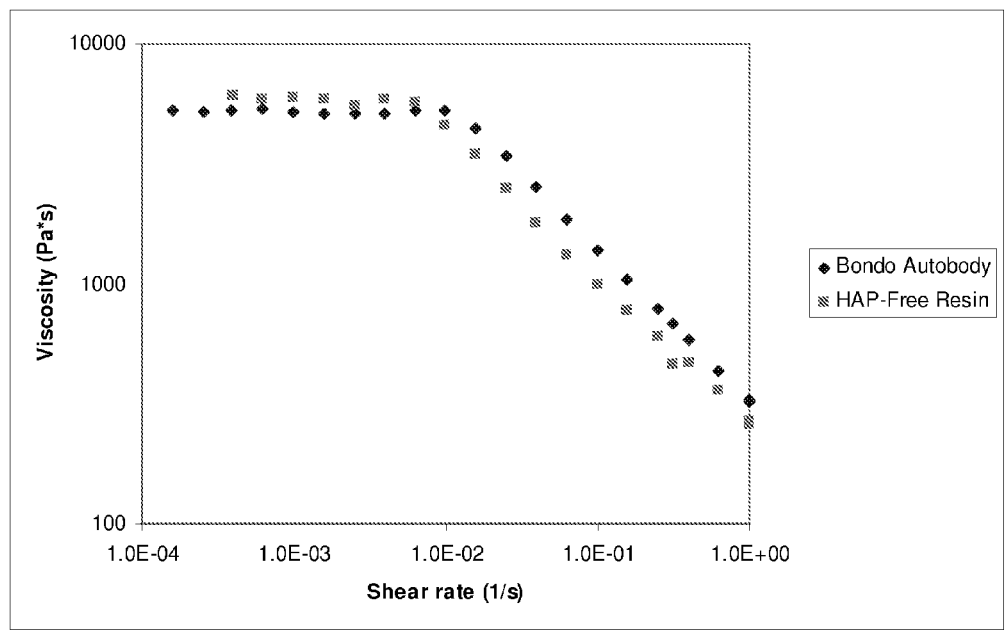
FIG. 13 shows a graph of viscosity as a function of shear rate for Bondo™ Autobody Filler and a HAP-free formulated resin containing 55% resin (19.25 wt % VE monomer and 35.75 wt % MLau), 25 wt % Talc, 15 wt % $MgCO_3$, and 5 wt % glass microspheres.
Figure 14:
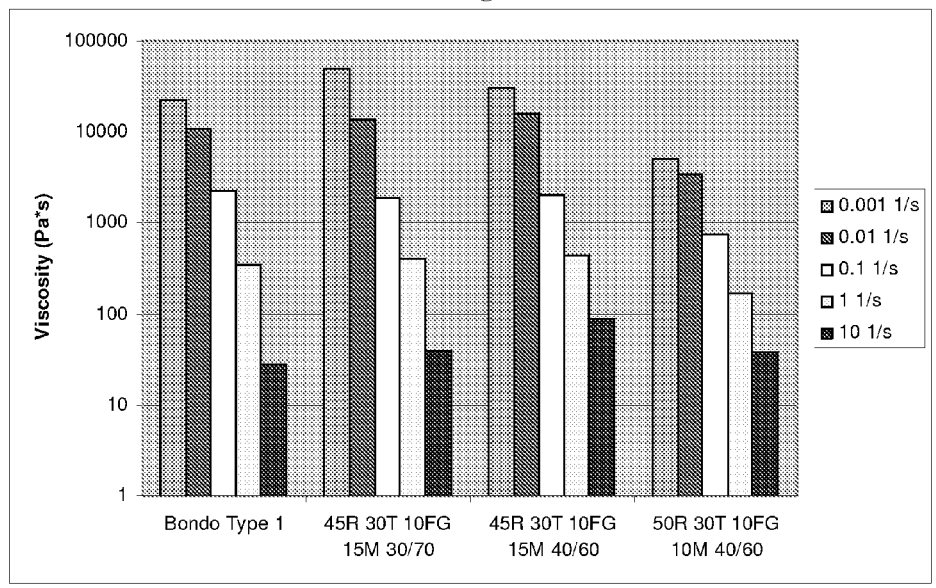
FIG. 14 shows a graph of viscosity at given shear rates for commercial repair resins (Bondo™ Type 1—Bondo Glass) and fatty acid based resins, which list the resin content (R), talc content (T), fibrous glass content (FG), $MgCO_3$ content (M), and $NaBO_2$ content (N). The numbers, such as 40/60, represent the ratio of VE to MLau used in the resin component.

The viscosity of the repair resin formulations and commercial repair resins, such as Bondo™ Autobody Filler, were constant up to approximately 0.01 l/s. Above that shear rate, the viscosity decreased exponentially with shear rate. Therefore, the uncured fluids are shear-thinning and non-Newtonian in nature. A typical viscosity curve is shown in FIG. 13 comparing the Bondo™ Autobody Filler to that of a zero HAP formulation with 55% by weight resin binder containing 35 wt % CN-151 (a low molecular weight difunctional vinyl ester monomer from Sartomer) and 65 wt % methacrylated lauric acid (MLau) with 45% filler containing 25 wt % Talc, 15 wt % $MgCO_3$, and 5 wt % Scotchlite K37 glass microspheres. As shown in FIG. 14, some formulations had higher viscosities relative to the commercial resin, whereas other formulations had similar, lower, or higher viscosities. Low HAP formulations had lower viscosities than similarly formulated zero HAP formulations because the of the of styrene's lower viscosity than MLau.

The thermo-mechanical properties of the repair resins were measured using dynamic mechanical analysis (DMA). Rectangular samples with approximate dimensions of 25 mm×9 mm×3 mm were tested using a TA Instruments 2980 DMA in single cantilever geometry. The samples were tested at 1 Hz with a deflection of 15 μm while ramping the temperature from −50° C. to 150° C. at a rate of 2° C./min Two temperature ramp experiments were run for each sample. The two ramps were nearly identical, indicating almost complete cure after the first run and indicating that additional DMA ramps were unnecessary.

Figure 15:
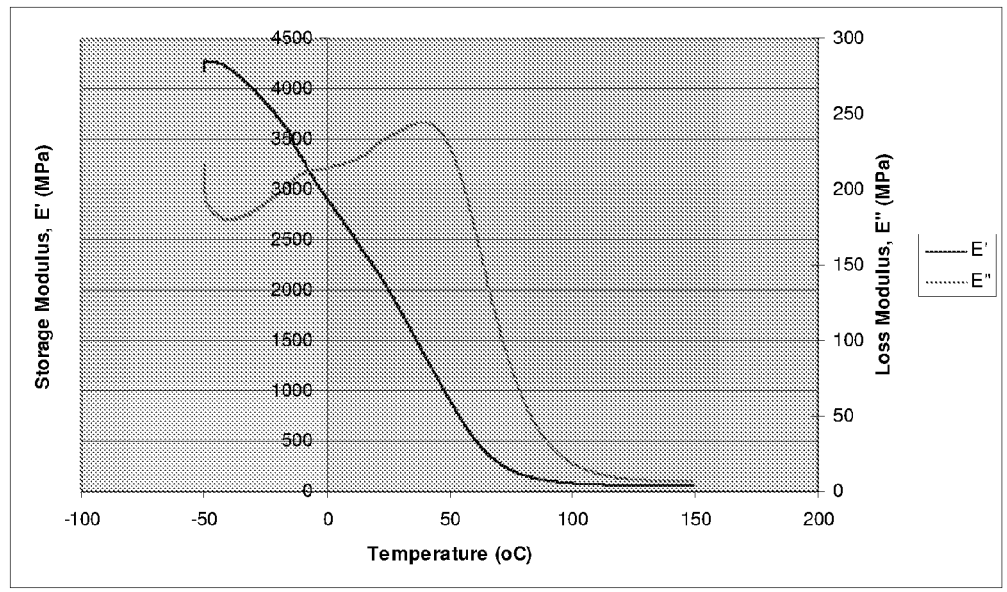
FIG. 15 shows DMA results for a repair resin containing 19.25 wt % CN-151, 35.75 wt % MLau, 22 wt % talc, 17 wt % $MgCO_3$, and 8 wt % $NaBO_2$.
Figure 16:
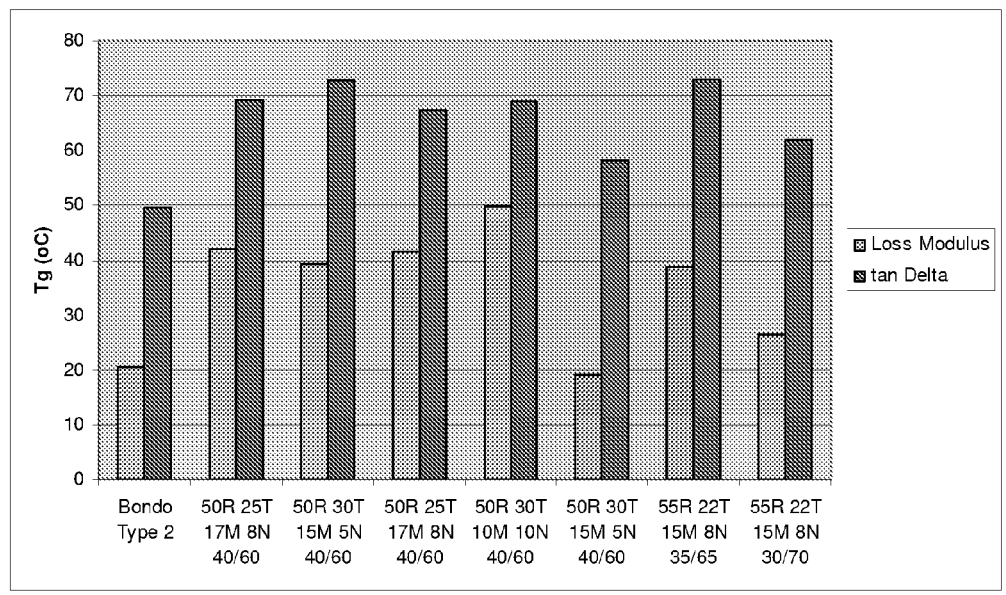
FIG. 16 shows $T_g$ as a function of resin formulation for commercial repair resins (Bondo™ Type 2—Autobody Filler) and fatty acid based resins.
Figure 17:
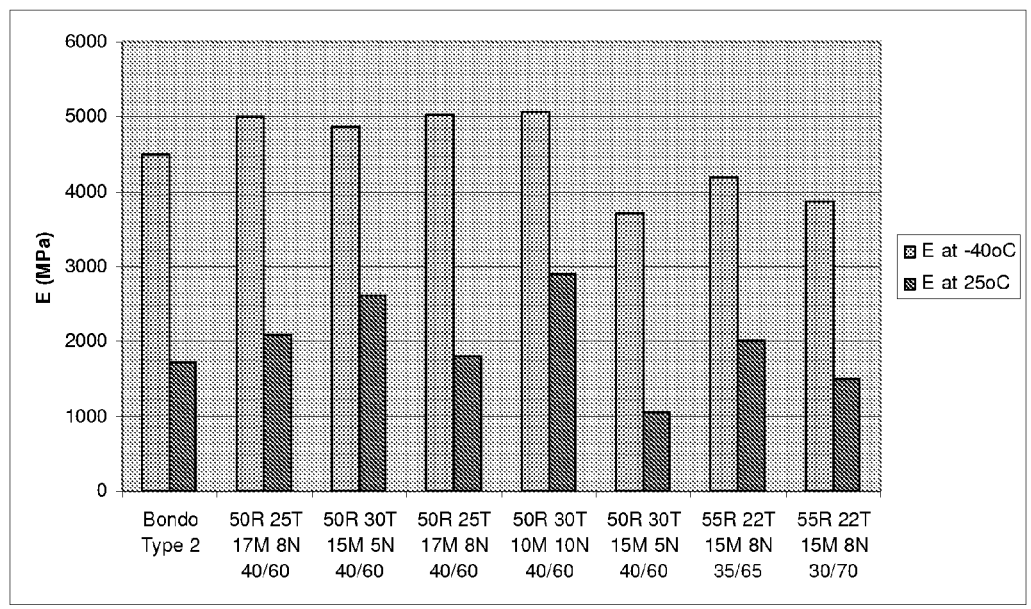
FIG. 17 shows the storage modulus as a function of resin formulation for commercial repair resins (Bondo™ Type 2—Autobody Filler) and fatty acid based resins.

A typical dynamic mechanical analysis plot of repair resins is shown in FIG. 15. The $T_g$ of this repair resin containing 19.25 wt % VE 828, 35.75 wt % MLau, 22 wt % talc, 17 wt % $MgCO_3$, and 8 wt % $NaBO_2$ was approximately 38° C., as shown by the peak of the loss modulus. This was actually higher than that found in commercial resins, such as Bondo™, which had a $T_g$ of about 25° C. However, the glass transition was significantly broader for the fatty acid-based repair resin. Overall, this broader $T_g$ should allow the resin more flexibility so it will be less fragile in cold weather. As shown by FIG. 16, lower and higher glass transition temperatures were easily formulated by varying the fatty acid content in the resin and the filler content. FIGS. 16 and 17 show that overall, similar and different dynamic mechanical properties relative to commercial resins were achievable. The low HAP formulations had higher Tg than the zero HAP formulations and narrower Tgs.

The temperature at which the peak in the loss modulus occurred in the fully post-cured polymer was considered the glass transition temperature of the material. The experimental error in $T_g$ was ±3° C. Tan delta can also be used as a measure of the glass transition temperature, but it is known that the maximum in tan delta is about 10° C.—about 20° C. above the loss modulus maximum.

Thermogravimetric analysis (TGA) was run on the samples using a TA Instruments Hi-Res TGA 2950. 10 mg samples were placed on a platinum sample holder. The samples were run in air up to 800° C. at 10° C./min The instrument measures the sample mass as a function of temperature throughout the experiment.

Figure 18:
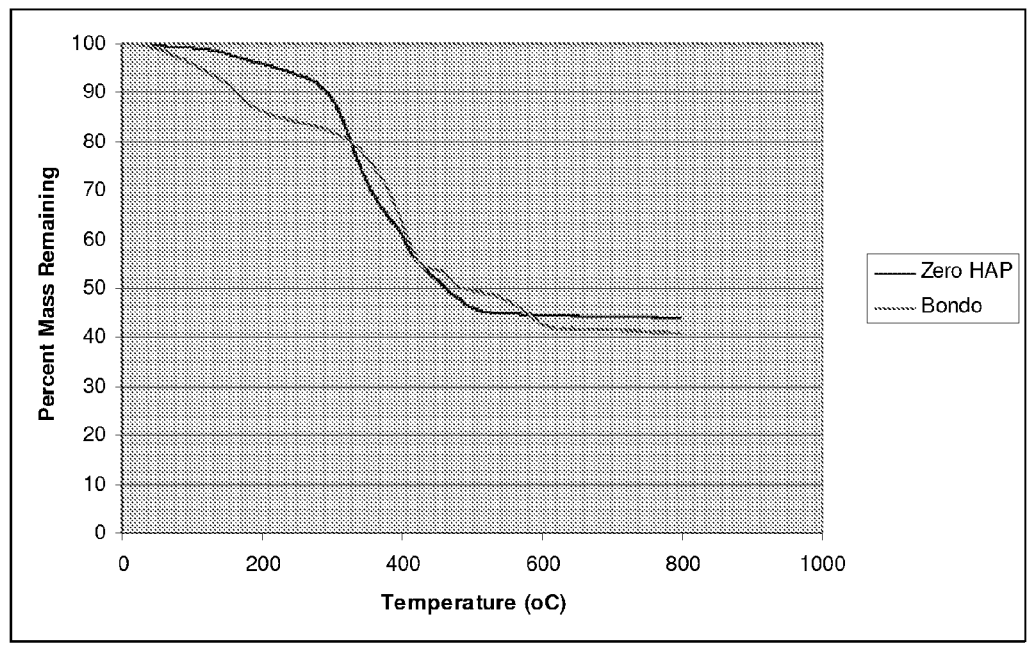
FIG. 18 shows TGA plots showing percent mass remaining vs. temperature for Bondo™ Glass and zero HAP resin containing 15.75 wt % CN-151, 29.25 wt % MLau, 30 wt % talc, 10 wt % fibrous glass, and 10 wt % $MgCO_3$.

FIG. 18 shows the thermogravimetric analysis of commercial and zero HAP formulated repair resins. Less mass loss occurred at lower temperatures due to the non-volatile nature of the MFA monomers vs. the highly volatile styrene in Bondo™. Overall, the commercial and zero HAP resins lose approximately the same amount of mass.

Flexural tests, in accordance with ASTM 790M, were performed to determine the modulus of elasticity and flexural strength. The samples had approximate dimensions of 10 mm×80 mm×64 mm and were measured prior to testing. The samples were tested flat-wise on a support span, resulting in a support-to-depth ratio of 16. All tests were performed at ambient conditions, which were approximately 22° C. and 40% relative humidity. The samples were tested using an Instron at a crosshead speed of 10 mm/min. The flexural modulus, elongation at failure, and flexural strength were calculated according to the ASTM standard.

Figure 19:
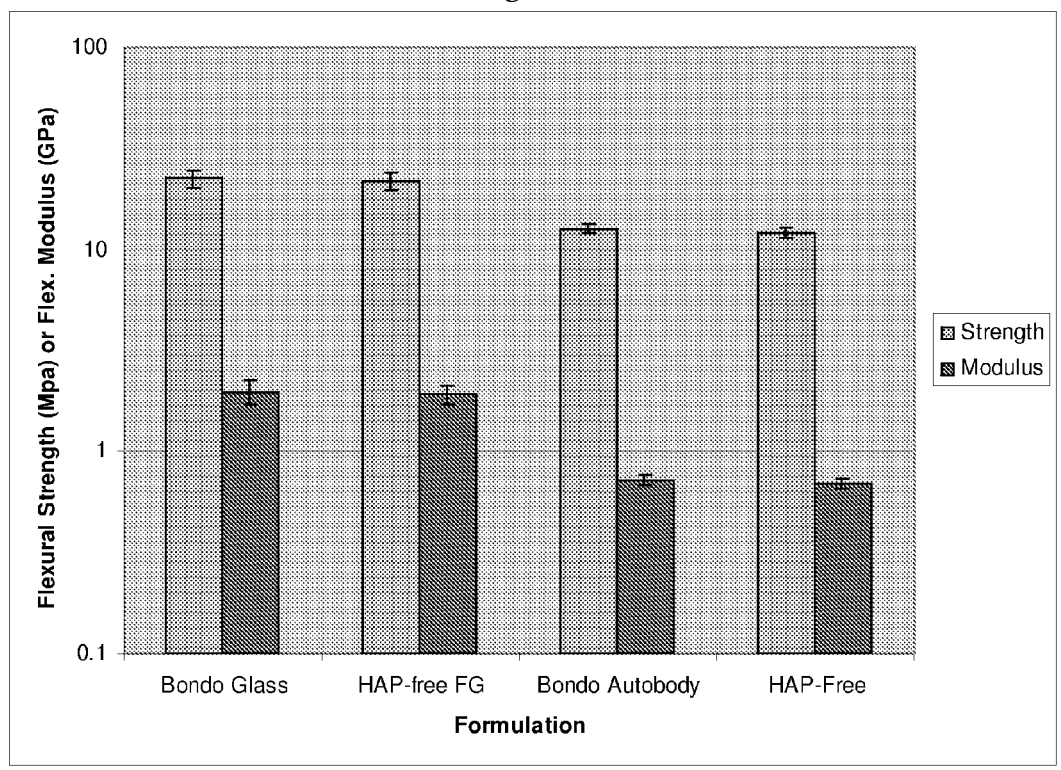
FIG. 19 shows a graph of flexural strength and flexural modulus for Bondo™ Glass (Type 1), Bondo™ Autobody Filler (Type 2), HAP-free FG (20% CN-151, 30% MLau, 30% T, 10% FG, and 10% M), and HAP-free (20% CN-151, 30% MLau, 30% T, 15% M, and 5% N).

FIG. 19 depicts the measured flexural strength and flexural modulus of commercial and formulated zero HAP resins and low HAP resins. The samples using fibrous glass exhibited significantly higher modulus and strengths than the samples without fibrous glass. However, there was no significant difference between the properties of the resins using fibrous glass for the commercial and zero HAP formulated resins. There was also no significant difference in the properties of the Bondo™ Autobody Filler and the zero HAP formulation with talc, $MgCO_3$, and $NaBO_2$.

Example 58

A blend of 65 wt % MFA and 35 wt % CN-151 vinyl ester was prepared by mixing 326.0 g MLau and 175.5 g CN-151 to act as a resin binder of a composite repair resin. The resin was heated at 70° C. for 15 min and manually mixed into a homogeneous solution. The resulting resin was a low viscosity solution.

Example 59

A blend of 70 wt % MFA and 30 wt % CN-151 vinyl ester was prepared by mixing 105.8 g MLau and 45.3 g CN-151. The resin was heated at 70° C. for 15 min and manually mixed into a homogeneous solution. The resulting resin was a low viscosity solution.

Example 60

Dimethylaniline in the amount of 0.064 g was added to 15.4 g of the resin in Example 58. Inorganic filler in the amount of 6.1 g talc, 4.2 g magnesium carbonate, and 2.2 g sodium metaborate were mixed into the resin until homogeneously dispersed to make a resin with composition 55 wt % binder, 22 wt % talc, 15 wt % $MgCO_3$, and 8 wt % $NaBO_2$. 2 wt % red cream hardener was added and the material was allowed to cure into a hard, but flexible solid. The $T_g$ of this material was 39° C. as measured using dynamic mechanical analysis at 1 Hz and 2° C./min from −50-150° C. The polymer composite had a modulus of 4.2 GPa at −40° C., and a modulus of 2.0 GPa at 25° C.

Example 61

Dimethylaniline in the amount of 0.064 g was added to 14.0 g of the resin in Example 58. Inorganic filler in the amount of 9.3 g talc, 4.6 g magnesium carbonate, and 3.1 g fibrous glass were mixed into the resin until homogeneously dispersed to make a resin with a composition of 45 wt % binder, 30 wt % talc, 15 wt % $MgCO_3$, and 10 wt % milled fiber glass. 2 wt % red cream hardener was added and the material was allowed to cure into a hard, but flexible, solid. The $T_g$ of this material was 47° C. as measured using dynamic mechanical analysis at 1 Hz and 2° C./min from −50-150° C. The polymer composite had a modulus of 5.7 GPa at −40° C., and a modulus of 2.9 GPa at 25° C.

Example 62

Dimethylaniline in the amount of 0.050 g was added to 12.0 g of the resin in Example 59. Inorganic filler in the amount of 8.2 g talc, 4.0 g magnesium carbonate, and 2.6 g fibrous glass were mixed into the resin until homogeneously dispersed to make a resin with composition 45 wt % binder, 30 wt % talc, 15 wt % MgCO$_3$, and 10 wt % milled fiber glass. 2 wt % red cream hardener was added and the material was allowed to cure into a hard, but flexible, solid. The T$_g$ of this material was 35° C. as measured using dynamic mechanical analysis at 1 Hz and 2° C./min from −50-150° C. The polymer composite had a modulus of 4.8 GPa at −40° C., and a modulus of 2.6 GPa at 25° C.

Example 63

0.0281 g of dimethylaniline was added to 6.61 g of a resin containing 67.11 g CN-151 and 100.00 g MLau (40 wt % CN-151 and 60 wt % MLau). 3.30 g talc, 2.20 g magnesium carbonate, and 1.11 g sodium metaborate were mixed into the resin to make a resin with composition 50 wt % binder, 25 wt % talc, 17 wt % MgCO$_3$, and 8 wt % NaBO$_2$. The overall dimethylaniline content was equal to 0.2 wt % of the total resin mass including inorganic filler. The unfilled resin was cured by adding 0.2739 g (2 wt %) Bondo™ Red Cream Hardener. The resin gelled within 30 minutes, giving adequate working time. The final solid produced was hard but flexible. The T$_g$ of this material was 41.6° C. as measured using dynamic mechanical analysis at 1 Hz and 2° C./min from −50-150° C. The polymer composite had a modulus of 5.03 GPa at −40° C., and a modulus of 1.81 GPa at 25° C.

Example 64

0.0271 g of dimethylaniline was added to 6.65 g of a resin containing 67.11 g CN-151 and 100.00 g MLau. 3.25 g talc, 2.18 g magnesium carbonate, and 1.07 g sodium metaborate were mixed into the resin. The overall dimethylaniline content was equal to 0.2 wt % of the total resin mass including inorganic filler. The unfilled resin was cured by adding 0.650 g (5 wt %) Bondo™ Red Cream Hardener. The resin gelled within 30 minutes, giving adequate working time. The final solid produced was hard and rigid. The T$_g$ of this material was 19° C. as measured using dynamic mechanical analysis at 1 Hz and 2° C./min from −50-150° C. The final solid produced was hard but flexible, but cured into a solid within 5 minutes, giving a very short working time. The T$_g$ of this material was 42° C. as measured using dynamic mechanical analysis at 1 Hz and 2° C./min from −50-150° C. The polymer composite had a modulus of 5.1 GPa at −40° C., and a modulus of 1.7 GPa at 25° C.

Example 65

0.0135 g of dimethylaniline was added to 6.96 g of a resin containing 67.11 g CN-151 and 100.00 g MLau. 3.48 g talc, 2.32 g magnesium carbonate, and 1.16 g sodium metaborate were mixed into the resin. The overall dimethylaniline content was equal to 0.1 wt % of the total resin mass including inorganic filler. The unfilled resin was cured by adding 0.3033 g (~2 wt %) Bondo™ Red Cream Hardener. The resin formed a solid within an hour, giving adequate working time. The final solid produced was hard but flexible with a gummy/sticky surface. The T$_g$ of this material was 41° C. as measured using dynamic mechanical analysis at 1 Hz and 2° C./min from −50-150° C. The polymer composite had a modulus of 4.9 GPa at −40° C., and a modulus of 1.7 GPa at 25° C.

Example 66

0.0281 g of dimethylaniline was added to 6.61 g of a resin containing 67.11 g Viapal UP 570G (unsaturated polyester monomer) and 100.00 g MLau. 3.30 g talc, 2.20 g magnesium carbonate, and 1.11 g sodium metaborate were mixed into the resin. The overall dimethylaniline content was equal to 0.2 wt % of the total resin mass including inorganic filler. The unfilled resin was cured by adding 0.2739 g (2 wt %) Bondo™ Red Cream Hardener. The resin formed a solid within 30 minutes, giving adequate working time. The final solid produced was hard but flexible.

Example 67

A blend of 35 wt % CN-151 and 65 wt % MLau was prepared by adding 78.2 g CN-151 to 145.2 g MLau. The resin was heated at 70° C. for 10 minutes and manually mixed into a homogeneous solution.

9.01 g of the CN-151/MLau was blended with 1.00 g styrene to make a repair resin binder with 10 wt % styrene. The resin was manually mixed at room temperature until uniform. The resulting resin was a low viscosity solution, and had a lower viscosity than the resins described in Examples 58 and 59. The composite repair resin was prepared by mixing all of the resin described in Example 59 with 25 wt % talc, 15 wt % magnesium carbonate, and 5 wt % sodium metaborate. To do this, the resin was mixed with 4.55 g talc, 2.73 g magnesium carbonate, and 0.91 g sodium metaborate. The resulting resin was a non-Newtonian fluid with a viscosity of 4.26×10$^6$ Pa*s at 10$^{-4}$ 1/s, 7.41×10$^5$ Pa*s at 10$^{-3}$ 1/s 1.29×10$^5$ Pa*s at 10$^{-2}$ 1/s, 1.11×10$^4$ Pa*s at 10$^{-1}$ 1/s, and 1062 Pa*s at 1 1/s.

Example 68

10.02 g of the CN-151/MLau prepared as listed in Example 67 was blended 1.10 g styrene to make a resin binder with 10 wt % styrene. The resin was blended with 0.095 g (0.4 wt %) dimethylaniline promoter, 5.05 g (25 wt %) talc, 3.03 g (15 wt %) MgCO$_3$, and 1.01 g (5 wt %) NaBO$_2$. The resin was cured with 0.40 g (2 wt %) Bondo™ Red Cream Hardener. The resin hardened in 10 minutes to form a solid. The polymer composite was hard, but flexible and had a Tg of 48.9° C. according to the loss modulus maximum, a modulus of 5.2 GPa at 40° C., and a modulus of 2.9 GPa at 25° C., as measured using dynamic mechanical analysis at 1 Hz and 2° C./min from −50-150° C.

Example 69

Bondo™ unsaturated polyester was purified from the fillers by dissolving about 18 g repair resin in about 25 g acetone in 50 mL centrifuge tubes. The organic phase readily dissolved in the acetone, while the inorganic fillers settled to the bottom of the tube. The organic components dissolved in the acetone were recovered and allowed to evaporate in the ambient environment for one week. The resin was then placed in an oven at 50° C. for one week to completely remove the acetone and styrene.

A blend of 55 wt % UPE and 45 wt % MOct was prepared by blending 7.5 g of the dried UPE from Example 60 with 6.13 g MOct. The resin was heated at 70° C. for 5 minutes and manually mixed into a homogeneous solution. This resin was blended with 30% filler consisting of 15.35 wt % talc, 8.95 wt % MgCO$_3$, and 5.85 wt % Scotchlite™ K37 glass microspheres. 13.01 g of resin was blended with 2.86 g talc, 1.67 g MgCO3, and 1.089 g glass microspheres.

The viscosity of the resin in was measured using a TA Instruments AR2000 rheometer. The resulting resin was a non-Newtonian fluid with a viscosity of 4200 Pa*s at 10$^{-4}$ 1/s, 2002 Pa*s at $10^{-3}$ 1/s, 1007 Pa*s at $10^{-2}$ 1/s, 212 Pa*s at $10^{-1}$ 1/s, and 132 Pa*s at 1 1/s. After measuring the viscosity, 0.066 g of dimethylaniline was added to promote the resin. 0.373 g (2 wt %) Bondo™ Red Cream Hardener was used to the cure the repair resin. The resulting resin formed a solid within 20 minutes. The resulting polymer composite was a flexible and relatively soft composite with a $T_g$ of 7.2° C. according to the loss modulus maximum, a modulus of 2 GPa at −40° C., and a modulus of 22 MPa at 25° C. as measured using dynamic mechanical analysis at 1 Hz and 2° C./min from −50-150° C.

Example 70

57.51 g of Bondo™ Fiber glass resin containing 28 wt % styrene was blended with 15.93 g MOct. The resin was allowed to evaporate for two weeks at room temperature until 12.33 g styrene evaporated from the resin. 2.6 g styrene was added back to the resin to produce a resin with 55 wt % UPE monomer, 35 wt % MOct, and 10 wt % styrene.

Example 71

A composite repair resin was formulated by blending 9.74 g of resin from Example 70 with 0.044 g dimethylaniline (0.3 wt %), 2.11 g talc (15 wt %), 0.99 g $MgCO_3$ (7 wt %), 0.42 g $NaBO_2$ (3 wt %), and 0.70 g Scotchlite™ K37 glass microspheres (5 wt %). The resin was cured with 0.28 g (2 wt %) Bondo™ Red Cream Hardener. The resin formed a solid within 20 minutes. The resulting polymer composite was hard but flexible and had a $T_g$ of 13° C. according to the loss modulus maximum, a modulus of 5.4 GPa at −40° C., and a modulus of 0.75 GPa at 25° C., as measured using dynamic mechanical analysis at 1 Hz and 2° C./min from −50-150° C.

Example 72

A composite repair resin was formulated by blending 7.05 g of resin from Example 70 with 1.51 g talc (15 wt %), 0.70 g $MgCO_3$ (7 wt %), 0.30 g $NaBO_2$ (3 wt %), and 0.50 g Scotchlite™ K37 glass microspheres (5 wt %). The resulting resin was a non-Newtonian fluid with a viscosity of 63.6 Pa*s $10^{-3}$ 1/s, 57.9 Pa*s at $10^{-2}$ 1/s, 40.6 Pa*s at $10^{-1}$ 1/s, and 32.8 Pa*s at 1 1/s.

Example 73

A composite repair resin was formulated by blending 9.82 g of resin from Example 70 with 0.0383 g dimethylaniline (0.3 wt %), 1.76 g talc (13 wt %), 1.08 g $MgCO_3$ (8 wt %), and 0.94 g milled fiber glass (7 wt %). The resin was cured with 0.26 g (2 wt %) Bondo™ Red Cream Hardener. The resin formed a solid within 20 minutes. The resulting polymer composite was hard but flexible. The resin had a $T_g$ of 13° C. according to the loss modulus maximum, a modulus of 6.1 GPa at −40° C., and a modulus of 1.01 GPa at 25° C. as measured using dynamic mechanical analysis at 1 Hz and 2° C./min from −50-150° C.

Example 74

A composite repair resin was formulated by blending 6.98 g of resin from Example 70 with 1.27 g talc (12 wt %), 0.77 g $MgCO_3$ (8 wt %), and 0.67 g milled fiber glass (7 wt %). The resulting resin was a non-Newtonian fluid with a viscosity of 207.7 Pa*s at $10^{-4}$ 1/s, 106.9 Pa*s at $10^{-3}$ 1/s, 49.4 Pa*s at $10^{-2}$ 1/s, 29.9 Pa*s at $10^{-1}$ 1/s, and 14.7 Pa*s at 1 1/s.

Example 75

173.5 g CN-151 and 326.0 g MLau were mixed in a beaker as per Example 58. 250.0 g of this resin was poured into a 1000 mL beaker. 9.27 g dimethylaniline was mixed into the resin follower by 100.0 g talc, 68.18 g magnesium carbonate, and 36.36 g sodium metaborate. 1 wt % Bondo™ red cream hardener was thoroughly mixed into the resin. The resin was then applied to a damaged area of a truck tailgate to fill the dent. The area was smoothed over using a putty knife to cover the entire damaged area and produce a fairly flat surface. After an hour, the resin was sanded to form a smooth surface to match the contour of the original tailgate structure. The cured zero HAP repair resin was hard and rigid and adhered very well to the part surface. Scraping the edges of the repaired area with a razor blade did not result in delamination of the resin.

Example 76

Figure 20A:
FIGS. 20(a)-20(b) are photos of zero HAP repair resin applied to dents in truck tailgate.
Figure 20B:
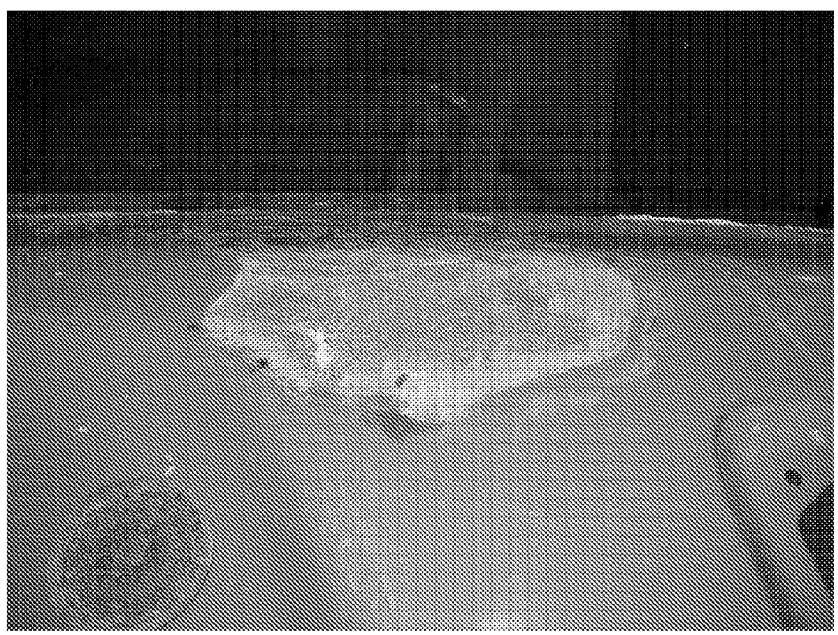

A tailgate of a truck with dents was repaired using a zero HAP repair resin formulation. This formulation had 19.25 wt % VE 828, 35.75 wt % MLau, 22 wt % talc, 17 wt % $MgCO_3$, and 8 wt % $NaBO_2$. The application of the resin and cure was similar to that of commercial repair resins. The resulting repair was excellent as shown in FIG. 20. The product was able to be sanded down to produce a smooth surface similar to that of commercial repair resins. Scraping the edges of the repaired zone with a razor blade did not result in delamination of the resin. This shows that the repair resin had good adhesion properties with the substrate.

Example 77

A blend of 65 wt % MFA and 35 wt % CN-151 vinyl ester was prepared by mixing 326.0 g MLau and 173.5 g CN-151 to act as a resin binder of a composite repair resin. 250.0 g of the resin binder was blended with 9.27 g (2 wt %) dimehylaniline, 100.0 g (22 wt %) talc, 68.18 g (15 wt %) $MgCO_3$, and 36.36 (8 wt %) $NaBO_2$. 10.0 g of this resin was cured by adding 0.2 g (~2 wt %) Bondo™ Red Cream Hardener. The resin formed a solid within 5 minutes. The final solid produced was hard but flexible.

Example 78

Hardener for the repair resin was formulated by blending benzoyl peroxide (30 wt %) and soap (70 wt %) together. 1.49 g benzoyl peroxide was blended with 3.46 g Gojo Multi-Green® Hand Cleaner 800 green hand soap.

Example 79

Hardener for the repair resin was formulated by blending benzoyl peroxide (30 wt %), soap (70 wt %), and canola oil (20 wt %) together. 1.11 g benzoyl peroxide was blended with 1.85 g Gojo MultiGreen® Hand Cleaner 800 green hand soap and 0.75 g canola oil.

Example 80

The hardener in Example 78 was used to cure the repair resin prepared in Example 77. 0.593 g of the hardener was added to 22.21 g of the repair resin. The hardener was mixed thoroughly with the resin. The high surfactant content of the hardener allowed for easy blending with the viscous repair resin. The resulting resin gelled in two minutes and cured into a hard, but flexible solid.

Example 81

The hardener in Example 79 was used to cure the repair resin prepared in Example 77. 0.555 g of the hardener was added to 26.30 g of the repair resin. The hardener was mixed thoroughly with the resin. The high surfactant content of the hardener allowed for easy blending with the viscous repair resin. The resulting resin gelled in three minutes and cured into a hard, but flexible solid.

Example 82

A repair resin was formulated with only a single inorganic filler. 5.305 g resin from Example 58 was mixed with 5.298 g talc to form a repair resin with 50 wt % binder and 50 wt % talc. The viscosity of the repair resin was measured using a TA Instruments AR2000 rheometer. The resulting resin was a non-Newtonian fluid with a viscosity of 7851 Pa*s at $10^{-4}$ 1/s, 4209 Pa*s at $10^{-3}$ 1/s, 3690 Pa*s at $10^{-2}$ 1/s, 997 Pa*s at $10^{-1}$ 1/s, and 250 Pa*s at 1 1/s.

Example 83

A repair resin was formulated with only a single inorganic filler. A blend of 65 wt % MFA and 35 wt % CN-151 vinyl ester was prepared by mixing 288.8 g MLau and 155.6 g CN-151 to act as a resin binder of a composite repair resin. The resin was heated at 70° C. for 15 min and manually mixed into a homogeneous solution. 12.376 g of the resin binder was mixed with 12.365 g talc to form a repair resin with 50 wt % binder and 50 wt % talc. 0.111 g dimethylaniline (0.45 wt %) was mixed into the resin to promote cure. 0.497 g (2 wt %) Bondo™ Red Cream Hardener was blended into the resin to cure it. The resulting composite polymer was hard, but flexible. The resin had $T_g$ of 39.1° C. according to the loss modulus maximum, a modulus of 5.25 GPa at −40° C., and a modulus of 2.2 GPa at 25° C. as measured using dynamic mechanical analysis at 1 Hz and 2° C./min from −50-150° C.

Example 84

A repair resin was formulated with only a single inorganic filler. 6.294 g resin from Example 58 was mixed with 4.195 g talc to form a repair resin with 60 wt % binder and 40 wt % talc. The viscosity of the repair resin was measured using a TA Instruments AR2000 rheometer. The resulting resin was a non-Newtonian fluid with a viscosity of 220 Pa*s at $10^{-4}$ 1/s, 78 Pa*s at $10^{-3}$ 1/s, 67 Pa*s at $10^{-2}$ 1/s, 39 Pa*s at $10^{-1}$ 1/s, and 16 Pa*s at 1 1/s.

Example 85

A repair resin was formulated with only a single inorganic filler. A blend of 65 wt % MFA and 35 wt % CN-151 vinyl ester was prepared by mixing 288.8 g MLau and 155.6 g CN-151 to act as a resin binder of a composite repair resin. The resin was heated at 70° C. for 15 min and manually mixed into a homogeneous solution. 6.915 g of the resin binder was mixed with 4.612 g talc to form a repair resin with 60 wt % binder and 40 wt % talc. 0.0524 g dimethylaniline (0.45 wt %) was mixed into the resin to promote cure. 0.234 g (2 wt %) Bondo™ Red Cream Hardener was blended into the resin to cure it. The resulting composite polymer was hard, but flexible. The resin had a $T_g$ of 44.2° C. according to the loss modulus maximum, a modulus of 4.2 GPa at −40° C., and a modulus of 1.81 GPa at 25° C. as measured using dynamic mechanical analysis at 1 Hz and 2° C./min from −50-150° C.

Example 86

A repair resin was formulated with only a single inorganic filler. 5.901 g resin from Example 58 was mixed with 3.934 g MgCO₃ to form a repair resin with 60 wt % binder and 40 wt % talc. The viscosity of the repair resin was measured using a TA Instruments AR2000 rheometer. The resulting resin was a non-Newtonian fluid with a viscosity of $1.1 \times 10^5$ Pa*s at $10^{-4}$ 1/s, $1.46 \times 10^4$ Pa*s at $10^{-3}$ 1/s, 5080 Pa*s at $10^{-2}$ 1/s, 1890 Pa*s at $10^{-1}$ 1/s, and 386 Pa*s at 1 1/s.

Example 87

A repair resin was formulated with only a single inorganic filler. A blend of 65 wt % MFA and 35 wt % CN-151 vinyl ester was prepared by mixing 430.6 g MLau and 231.9 g CN-151 to act as a resin binder of a composite repair resin. The resin was heated at 70° C. for 15 min and manually mixed into a homogeneous solution. 11.797 g of the resin binder was mixed with 7.863 g MgCO₃ to form a repair resin with 60 wt % binder and 40 wt % talc. 0.0925 g dimethylaniline (0.47 wt %) was mixed into the resin to promote cure. 0.394 g (2 wt %) Bondo™ Red Cream Hardener was blended into the resin to cure it. The resulting composite polymer was hard, but flexible. The resin had a $T_g$ of 45.5° C. according to the loss modulus maximum, a modulus of 4.8 GPa at −40° C., and a modulus of 2.06 GPa at 25° C. as measured using dynamic mechanical analysis at 1 Hz and 2° C./min from −50-150° C.

It is to be understood that even though numerous characteristics and advantages of the present invention have been set forth in the foregoing description, together with details of the method, the disclosure is illustrative only, and changes may be made within the principles of the invention to the full extent indicated by the broad general meaning of the terms in which the appended claims are expressed.

What is claimed is:

1. A method of making a composite, comprising step of:
    curing a curable composition to form a composite, said curable composition comprising at least one filler and a curable resin binder including at least one fatty acid monomer, a cross-linking polymer compound, and optionally a volatile monomer, and wherein the curable composition contains not more than 15% by weight of the volatile monomer, based on the total weight of the curable composition, and
    wherein the at least one fatty acid monomer is selected from the group consisting of:

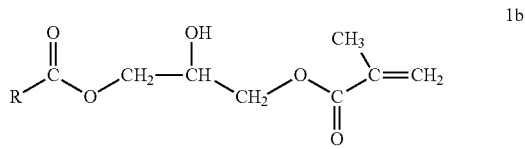

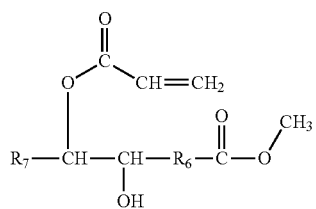
2b

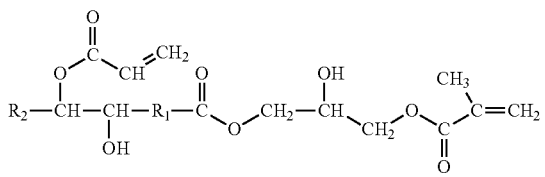
3a

3b

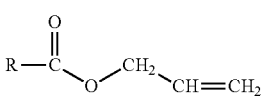
4a

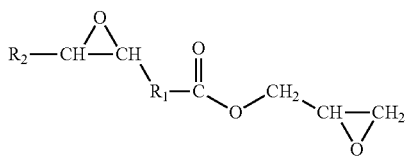
4b

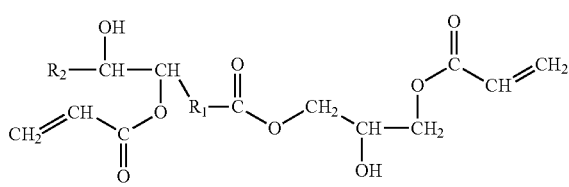
4c

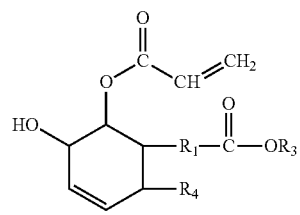
6b, 8a

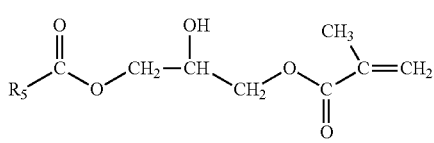
7b

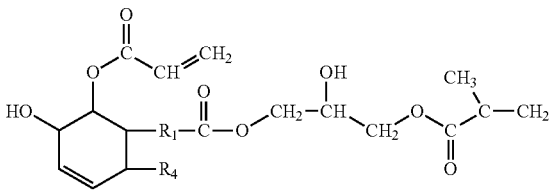
8b wherein each of R, $R_2$ and $R_4$ contain 2-30 carbon atoms and are selected from the group consisting of a saturated alkyl residue, an unsaturated alkyl residue; an acetylenic alkyl residue, a hydroxy alkyl residue, a carboxylic acid alkyl residue, a divinyl ether alkyl residue, a sulfur-containing alkyl residue, an amide alkyl residue, a methoxy alkyl residue, a keto alkyl residue, a halogenated alkyl residue, a branched methoxy alkyl residue, a branched hydroxy alkyl residue, an epoxy alkyl residue, a fatty acyl-CoA alkyl residue, a cyclopropane alkyl residue, a cyclopentenyl alkyl residue, a cyclohexyl alkyl residue, a furanoid alkyl residue, a phenylalkanoic alkyl residue, and a lipoic alkyl residue;

$R_1$ is a fatty acid segment having a backbone length of 1-25 carbon atoms selected from the group consisting of a saturated alkylene segment, an unsaturated alkylene segment; an acetylenic alkylene segment, a hydroxy alkylene segment, a divinyl ether alkylene segment, a sulfur-containing alkylene segment, an amide alkylene segment, a methoxy alkylene segment, a keto alkylene segment, a halogenated alkylene segment, a branched methoxy alkylene segment, a branched hydroxyl alkylene segment, an epoxy alkylene segment, a fatty acyl-CoA alkylene segment, a cyclopropane alkylene segment, a cyclopentenyl alkylene segment, a cyclohexyl alkylene segment, a furanoid alkylene segment, a phenylalkanoic alkyl segment, and a lipoic alkylene segment;

$R_3$ is selected from the group consisting of H and an alkyl residue having 1-10 carbon atoms;

$R_5$ is an unsaturated cyclic alkyl residue having 10-50 carbon atoms optionally substituted with a group selected from $R_1$ and $R_4$;

$R_6$ is a fatty acid segment having a backbone length of 1-25 carbon atoms selected from the group consisting of a saturated alkylene segment, an acetylenic alkylene segment, a hydroxy alkylene segment, a divinyl ether alkylene segment, a sulfur-containing alkylene segment, an amide alkylene segment, a methoxy alkylene segment, a keto alkylene segment, a halogenated alkylene segment, a branched methoxy alkylene segment, a branched hydroxyl alkylene segment, an epoxy alkylene segment, a fatty acyl-CoA alkylene segment, a cyclopropane alkylene segment, a cyclopentenyl alkylene segment, a cyclohexyl alkylene segment, a furanoid alkylene segment, a phenylalkanoic alkyl segment, and a lipoic alkylene segment; and $R_7$ contains 2-30 carbon atoms and is selected from the group consisting of a saturated alkyl residue, an acetylenic alkyl residue, a hydroxy alkyl residue, a carboxylic acid alkyl residue, a divinyl ether alkyl residue, a sulfur-containing alkyl residue, an amide alkyl residue, a methoxy alkyl residue, a keto alkyl residue, a halogenated alkyl residue, a branched methoxy alkyl residue, a branched hydroxy alkyl residue, an epoxy alkyl residue, a fatty acyl-CoA alkyl residue, a cyclopropane alkyl residue, a cyclopentenyl alkyl residue, a cyclohexyl alkyl residue, a furanoid alkyl residue, a phenylalkanoic alkyl residue, and a lipoic alkyl residue.

2. The method of claim 1, wherein the fatty acid monomer is selected from the group consisting of methacrylated fatty acid monomers, methacrylated fatty acid esters, acrylated fatty acid esters and mixtures thereof.

3. The method of claim 1, wherein the cross-linking polymer compound is selected from the group consisting of unsaturated polyesters, vinyl esters and polyurethanes.

4. The method of claim 1, wherein the filler is selected from the group consisting of talc, magnesium carbonate, sodium metaborate, fibrous glass, silica thickener, glass microspheres, phenolic micro-balloons, alumina, and sand.

5. The method of claim 1, wherein the curable composition comprises a volatile monomer.

6. The method of claim 5, wherein the volatile monomer is selected from the group consisting of styrene, methyl methacrylate, divinyl benzene, 2-hydroxymethacrylate, alpha-methyl styrene, para-methyl styrene and mixtures thereof.

7. The method of claim 1, wherein the curable composition comprises 30-80% by weight filler material and 20-70% by weight of curable resin binder, based on the total weight of the curable composition, and the fatty acid monomer comprises from about 5% to about 95% by weight, based on the total weight the resin binder and the cross-linking polymer comprises from about 5% to about 90% by weight, based on the total weight of the resin binder.

8. The method of claim 1, wherein the curable composition comprises 35-70% by weight filler material and 30-65% by weight of curable resin binder, based on the total weight of the curable composition, and the fatty acid monomer comprises from about 15% to about 80% by weight, based on the total weight the resin binder and the cross-linking polymer comprises from about 10% to about 85% by weight, based on the total weight of the resin binder.

9. The method of claim 1, wherein the curable composition comprises 40-60% by weight filler material and 40-60% by weight of curable resin binder, based on the total weight of the curable composition, and the fatty acid monomer comprises from about 20% to about 75% by weight, based on the total weight the resin binder and the cross-linking polymer comprises from about 15% to about 80% by weight, based on the total weight of the resin binder.

10. A composite made by the method of claim 1.

11. A curable composition which is curable to form a composite, said curable composition comprising:
a resin binder; and
a filler material; and
wherein the resin binder comprises a mixture of:
a cross-linking polymer compound,
at least one fatty acid monomer having the formula 2b:

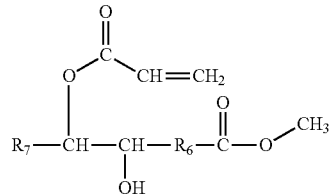

wherein $R_6$ is a fatty acid segment having a backbone length of 1-25 carbon atoms selected from the group consisting of a saturated alkylene segment, an acetylenic alkylene segment, a hydroxy alkylene segment, a divinyl ether alkylene segment, a sulfur-containing alkylene segment, an amide alkylene segment, a methoxy alkylene segment, a keto alkylene segment, a halogenated alkylene segment, a branched methoxy alkylene segment, a branched hydroxyl alkylene segment, an epoxy alkylene segment, a fatty acyl-CoA alkylene segment, a cyclopropane alkylene segment, a cyclopentenyl alkylene segment, a cyclohexyl alkylene segment, a furanoid alkylene segment, a phenylalkanoic alkyl segment, and a lipoic alkylene segment; and $R_7$ contains 2-30 carbon atoms and is selected from the group consisting of a saturated alkyl residue, an acetylenic alkyl residue, a hydroxy alkyl residue, a carboxylic acid alkyl residue, a divinyl ether alkyl residue, a sulfur-containing alkyl residue, an amide alkyl residue, a methoxy alkyl residue, a keto alkyl residue, a halogenated alkyl residue, a branched methoxy alkyl residue, a branched hydroxy alkyl residue, an epoxy alkyl residue, a fatty acyl-CoA alkyl residue, a cyclopropane alkyl residue, a cyclopentenyl alkyl residue, a cyclohexyl alkyl residue, a furanoid alkyl residue, a phenylalkanoic alkyl residue, and a lipoic alkyl residue; and optionally a volatile monomer, wherein the curable composition contains not more than 15% by weight of the volatile monomer, based on the total weight of the curable composition.

12. The curable composition of claim 11, wherein the curable composition comprises a volatile monomer selected from the group consisting of styrene, methyl methacrylate, divinyl benzene, 2-hydroxymethacrylate, alpha-methyl styrene, para-methyl styrene and mixtures thereof.

13. The curable composition of claim 11, wherein the filler material is selected from the group consisting of talc, magnesium carbonate, sodium metaborate, fibrous glass, silica thickener, glass microspheres, phenolic micro-balloons, alumina, and sand.

14. The curable composition of claim 11, wherein the curable composition comprises 30-80% by weight filler material and 20-70% by weight of curable resin binder, based on the total weight of the curable composition, and the fatty acid monomer comprises from about 5% to about 95% by weight, based on the total weight the resin binder and the cross-linking polymer comprises from about 5% to about 90% by weight, based on the total weight of the resin binder.

15. The curable composition of claim 11, wherein the curable composition comprises 35-70% by weight filler material and 30-65% by weight of curable resin binder, based on the total weight of the curable composition, and the fatty acid monomer comprises from about 15% to about 80% by weight, based on the total weight the resin binder and the cross-linking polymer comprises from about 10% to about 85% by weight, based on the total weight of the resin binder.

16. The curable composition of claim 11, wherein the curable composition comprises 40-60% by weight filler material and 40-60% by weight of curable resin binder, based on the total weight of the curable composition, and the fatty acid monomer comprises from about 20% to about 75% by weight, based on the total weight the resin binder and the cross-linking polymer comprises from about 15% to about 80% by weight, based on the total weight of the resin binder.

17. The curable composition of claim 11, wherein the cross-linking polymer compound is selected from the group consisting of unsaturated polyesters, vinyl esters and polyurethanes.

18. The curable composition of claim 11, wherein the curable composition comprises not more than about 10% by weight of the volatile monomer.

19. The curable composition of claim 11, wherein the curable composition comprises not more than about 5% by weight of the volatile monomer.

20. The curable composition of claim 11, wherein the curable composition contains no volatile monomer.

* * * * *

UNITED STATES PATENT AND TRADEMARK OFFICE
CERTIFICATE OF CORRECTION

PATENT NO. : 8,211,967 B2
APPLICATION NO. : 13/283061
DATED : July 3, 2012
INVENTOR(S) : John Joseph La Scala, James Matthew Sands and Giuseppe Raffaello Palmese It is certified that error appears in the above-identified patent and that said Letters Patent is hereby corrected as shown below:

Col. 1, Line 7-9 insert

--Statement of Government Interest

This invention was made with government support under Contract Nos. DAAD 19-02-2-0010 and W911NF-06-2-0013 awarded by the Army Research Laboratory. The government has certain rights in the invention.--

Signed and Sealed this
Fifth Day of February, 2013

Teresa Stanek Rea
*Acting Director of the United States Patent and Trademark Office*